United States Patent Office 2,854,433
Patented Sept. 30, 1958

---

2,854,433

AROMATIC POLYEPOXIDE TREATED DERIVATIVES OF ALKYLENE OXIDE-AMINE MODIFIED PHENOLIC RESINS, AND METHOD OF MAKING SAME

Melvin De Groote, St. Louis, and Kwan-Ting Shen, Brentwood, Mo., assignors to Petrolite Corporation, Wilmington, Del., a corporation of Delaware No Drawing. Original application April 22, 1953, Serial No. 350,535, now Patent No. 2,771,434, dated November 20, 1956. Divided and this application June 15, 1956, Serial No. 591,557

4 Claims. (Cl. 260—45.1)

The present invention is a division of our copending application Serial No. 350,535, filed April 22, 1953, now U. S. Patent No. 2,771,434.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

Attention is directed to two co-pending De Groote applications, Serial No. 310,555, filed September 19, 1952, now U. S. Patent 2,695,891, and Serial No. 333,390, filed January 26, 1953, now U. S. Patent 2,771,449. These two applications describe hydrophile products obtained by the oxyalkylation of the condensation product of certain phenol-aldehyde resins with respect to cyclic amidines and formaldehyde.

The present invention is concerned with a method of reacting said oxyalkylated derivatives of the kind just described with a phenolic polyepoxide of the kind previously described in our aforementioned co-pending application, Serial No. 305,079.

Thus the present invention is concerned with products of reaction obtained by a 3-step manufacturing process involving (1) condensing certain phenol aldehyde resins, hereinafter described in detail, with certain cyclic amidines, hereinafter described in detail, and formaldehyde;
(2) oxyalkylation of the condensation product with certain monoepoxides, hereinafter described in detail; and
(3) oxyalkylation of the previously oxyalkylated resin condensate with certain phenolic polyepoxides, hereinafter described in detail, and cogenerically associated compounds formed in their preparation.

A more limited aspect of the present invention is concerned with products of reaction wherein the oxyalkylated resin condensate is reacted with a member of the class of compounds of the following formula:

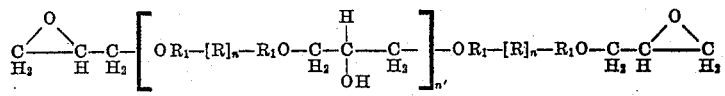

in which R represents a divalent radical including ketone residues formed by the elimination of the ketonic oxygen atom and aldehyde residues obtained by the elimination of the aldehydic oxygen atom; the divalent radical

the divalent

radical, the divalent sulfone radical, and the divalent monosulfide radical —S—, the divalent radical —CH$_2$SCH$_2$—, and the divalent disulfide radical —S—S—; and R$_1$0 is the divalent radical obtained by the elimination of a hydroxyl hydrogen atom and a nuclear hydrogen atom from the phenol

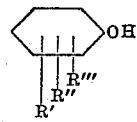

in which R′, R″, and R‴ represent hydrogen and hydrocarbon substituents of the aromatic nucleus, said substituent member having not over 18 carbon atoms.

A further limited aspect of the invention is represented by the products wherein the oxyalkylated resin condensate is reacted with a member of the class of (a) compounds of the following formula:

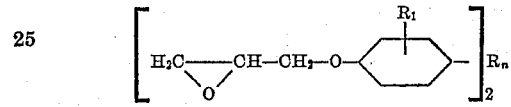

wherein R is essentially an aliphatic hydrocarbon bridge, each $n$ independently has one of the values 0 to 1, and R$_1$ is an alkyl radical containing from 1 to 4 carbon atoms, or even 12 carbon atoms, and (b) cogenerically associated compounds formed in the preparation of (a) preceding, including monoepoxides.

Reference herein to being thermoplastic or non-thermosetting characterizes products as being liquids at ordinary temperature or readily convertible to liquids by merely heating below the point of pyrolysis and thus differentiates them from infusible resins. Reference to being soluble in an organic solvent means any of the usual organic solvents, such as alcohols, ketones, esters, ethers, mixed solvents, etc. Reference to solubility is merely to differentiate from a reactant which is not soluble and might be not only insoluble but also infusible. Furthermore, solubility is a factor insofar that it is sometimes desirable to dilute the compound containing the epoxy rings before reacting with the monoepoxide-derived product. In such instances, of course, the solvent selected would have to be one which is not susceptible to oxyalkylation, as for example, kerosene, benzene, toluene, dioxane, various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxy rings or oxirane rings in the alpha-omega position. This is a departure, of course, from the standpoint of strictly formal nomenclature as in the examples of the simplest diepoxide which contains at least 4 carbon atoms and is formally described as 1,2-epoxy-3,4-epoxybutane(1,2-3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric phenols containing an average of more than one epoxide group per molecule and free from functional groups other than epoxide and hydroxyl groups. See U. S. Patent No. 2,494,295, dated January 10, 1950, to Greenlee. The compounds here included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins.

Having obtained a reactant having generally 2 epoxy rings as depicted in the last formula preceding, or low molal polymers thereof, it becomes obvious the reaction can take place with any oxyalkylated phenol-aldehyde resin by virtue of the fact that there are always present either phenolic hydroxyl radicals or alkanol radicals resulting from the oxyalkylation of the phenolic hydroxyl radicals; there may be present reactive hydrogen atoms attached to a nitrogen atom or an oxygen atom, depending on whether initially there was present a hydroxylated group attached to an amino hydrogen group or a secondary amino group. In any event there is always a multiplicity of reactive hydrogen atoms present in the oxyalkylated amine-modified phenol-aldehyde resin.

To illustrate the products which represent the subject matter of the present invention reference will be made to a reaction involving a mole of the oxyalkylating agent, i. e., the compound having two oxirane rings and an oxyalkylated amine condensate. Proceeding with the example previously described it is obvious the reaction ratio of two moles of the oxyalkylated amine condensate to one mole of the oxyalkylating agent gives a product which may be indicated as follows:

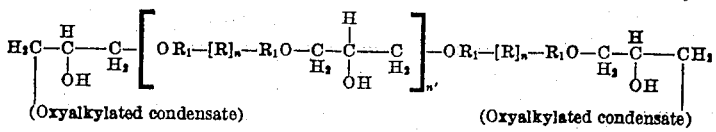

(Oxyalkylated condensate)       (Oxyalkylated condensate)

in which the various characters have their previous significance and the characterization "oxyalkylated condensate" is simply an abbreviation for the oxyalkylated condensate which is described in greater detail subsequently.

Such final product in turn also must be soluble but solubility is not limited to an organic solvent but may include water, or for that matter, a solution of water containing an acid such as hydrochloric acid, acetic acid, hydroxyacetic acid, etc. In other words, the nitrogen groups present whether two or more, may or may not be significantly basic and it is immaterial whether aqueous solubility represents an anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired, but also serves to emphasize the fact that in many instances the preferred compounds have distinct water-solubility or are distinctly dispersible in 5% gluconic acid. For instance, the products freed from any solvent can be shaken with 5 to 20 times their weight of 5% gluconic acid at ordinary temperature and show at least some tendency towards being self-dispersing. The solvent which is generally tried is xylene. If xylene alone does not serve then a mixture of xylene and methanol, or 70 parts of xylene and 30 parts of methanol, can be used. Sometimes it is desirable to add a small amount of acetone to the xylene-methanol mixture, for instance, 5% to 10% of acetone. As oxyalkylation proceeds the significance of the basicity of any nitrogen group is obviously diminished.

The polyepoxide-treated condensates obtained in the manner described are, in turn, oxyalkylation-susceptible and valuable derivatives can be obtained by further reaction with ethylene oxide, propylene oxide, ethylene imine, etc.

Similarly, the polyepoxide-derived compounds can be reacted with a product having both a nitrogen group and a 1,2-epoxy group, such as 3-dialkylaminoepoxypropane. See U. S. Patent No. 2,520,093, dated August 22, 1950, to Gross.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides, emulsifying agents, as, for example, for cosmetics, spray oils, water-repellent textile finishes; as lubricants, etc.

For purpose of resolution of petroleum emulsions of the water-in-oil type, we particularly prefer to use those products which as such or in the form of the free base or hydrate, i. e., combination with water or particularly in the form of a low molal organic acid salt such as the gluconates or the acetate or hydroxy acetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene glycol diethylether, or a low molal alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood that the reference in the hereto appended claims as to the use of xylene in the emulsification test includes such obvious variant.

For purpose of convenience, what is said hereinafter will be divided into ten parts with Part 3, in turn, being divided into three subdivisions:

Part 1 is concerned with our preference in regard to the polyepoxide and particularly the diepoxide reactant;

Part 2 is concerned with certain theoretical aspects of diepoxide preparation;

Part 3, Subdivision A, is concerned with the preparation of monomeric diepoxides, including Table I;

Part 3, Subdivision B, is concerned with the preparation of low molal polymeric epoxides or mixtures containing low molal polymeric epoxides as well as the monomer and includes Table II;

Part 3, Subdivision C, is concerned with miscellaneous phenolic reactants suitable for diepoxide preparation;

Part 4 is concerned with the phenol-aldehyde resin which is subjected to modification by condensation reaction to yield an amine-modified resin;

Part 5 is concerned with appropriate basic cyclic amidines which may be employed in the preparation of the herein described amine-modified resins;

Part 6 is concerned with reactions involving the resin, the amine, and formaldehyde to produce specific products or compounds which are then subjected to oxyalkylation with monoepoxides;

Part 7 is concerned with the oxyalkylation of the products decribed in Part 6, preceding;

Part 8 is concerned with reactions involving the two preceding types of materials and examples obtained by such reactions. Generally speaking, this involves nothing more than a reaction between two moles of a previously prepared oxyalkylated amine modified phenol-aldehyde resin condensate as described and one mole of a polyepoxide so as to yield a new and larger resin molecular or comparable product;

Part 9 is concerned with the resolution of petroleum emulsions of the water-in-oil type by means of the previously described chemical compounds or reaction products; and Part 10 is concerned with uses for the products herein described either as such or after modification, including any applications other than those involving resolution of petroleum emulsions of the water-in-oil type.

PART 1

As will be pointed out subsequently, the preparation of polyepoxides may include the formation of a small amount of material having more than two epoxide groups per molecule. If such compounds are formed they are perfectly suitable except to the extent that they may tend to produce ultimate reaction products which are not solvent-soluble liquids or low-melting solids. Indeed, they tend to form thermosetting resins or insoluble materials. Thus, the specific objective by and large is to produce diepoxides as free as possible from any monoepoxides and as free as possible from polyepoxides in which there are more than two epoxide groups per molecule. Thus, for practical purposes what is said hereinafter is largely limited to polyepoxides in the form of diepoxides.

As has been pointed out previously one of the reactants employed is a diepoxide reactant. It is generally obtained from phenol (hydroxybenzene) or substituted phenol. The ordinary or conventional manufacture of the epoxides usually results in the formation of a co-generic mixture as explained subsequently. Preparation of the monomer or separation of the monomer from the remaining mass of the co-generic mixture is usually expensive. If monomers were available commercially at a low cost, or if they could be prepared without added expense for separation, our preference would be to use the monomer. Certain monomers have been prepared and described in the literature and will be referred to subsequently. However, from a practical standpoint one must weigh the advantage, if any, that the monomer has over other low molal polymers from a cost standpoint; thus, we have found that one might as well attempt to prepare a monomer and fully recognize that there may be present, and probably invariably are present, other low molal polymers in comparatively small amounts. Thus, the materials which are most apt to be used for practical reasons are either monomers with some small amounts of polymers present or mixtures which have a substantial amount of polymers present. Indeed, the mixture can be prepared free from monomers and still be satisfactory. Briefly, then, our preference is to use the monomer or the monomer with the minimum amount of higher polymers.

It has been pointed out previously that the phenolic nuclei in the epoxide reactant may be directly united, or united through a variety of divalent radicals. Actually, it is our preference to use those which are commercially available and for most practical purposes it means instances where the phenolic nuclei are either united directly without any intervening linking radical, or else united by a ketone residue or formaldehyde residue. The commercial bis-phenols available now in the open market illustrate one class. The diphenyl derivatives illustrate a second class, and the materials obtained by reacting substituted monofunctional phenols with an aldehyde illustrate the third class. All the various known classes may be used but our preference rests with these classes due to their availability and ease of preparation, and also due to the fact that the cost is lower than in other examples.

Although the diepoxide reactants can be produced in more than one way, as pointed out elsewhere, our preference is to produce them by means of the epichlorohydrin reaction referred to in detail subsequently.

One epoxide which can be purchased in the open market and contains only a modest amount of polymers corresponds to the derivative of bis-phenol A. It can be used as such, or the monomer can be separated by an added step which involves additional expense. This compound of the following structure is preferred as the epoxide reactant and will be used for illustration repeatedly with the full understanding that any of the other epoxides described are equally satisfactory, or that the higher polymers are satisfactory, or that mixtures of the monomer and higher polymers are satisfactory. The formula for this compound is

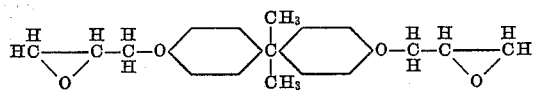

Reference has just been made to bis-phenol A and a suitable epoxide derived therefrom. Bis-phenol A is dihydroxy-diphenyl-dimethyl methane, with the 4,4' isomers predominating and with lesser quantities of the 2,2' and 4,2' isomers being present. It is immaterial which one of these isomers is used and the commercially available mixture is entirely satisfactory.

Attention is again directed to the fact that in the instant part, to wit, Part 1, and in succeeding parts, the text is concerned almost entirely with epoxides in which there is no bridging radical or the bridging radical is derived from an aldehyde or a ketone. It would be immaterial if the divalent linking radical would be derived from the other groups illustrated for the reason that nothing more than mere substitution of one compound for the other would be required. Thus, what is said hereinafter, although directed to one class or a few classes, applies with equal force and effect to the other classes of epoxide reactants.

If sulfur-containing compounds are prepared they should be freed from impurities with considerable care for the reason that any time that a low-molal sulfur-containing compound can react with epichlorohydrin there may be formed a by-product in which the chlorine happened to be particularly reactive and may represent a product, or a mixture of products, which would be unusually toxic, even though in comparatively small concentration.

PART 2

The polyepoxides and particularly the diepoxides can be derived by more than one method as, for example, the use of epichlorohydrin or glycerol dichlorohydrin. A number of problems are involved in attempting to produce these materials free from cogeneric materials of related composition. For a discussion of these difficulties, reference is made to U. S. Patent No. 2,819,212, beginning at column 7, line 21.

convenience, reference will be made to two only, to wit, aforementioned U. S. Patent 2,506,486, and aforementioned U. S. Patent No. 2,530,353.

Purely by way of illustration, the following diepoxides, or diglycidyl ethers as they are sometimes termed, are included for purpose of illustration. These particular compounds are described in the two patents just mentioned.

TABLE I

| Example number | Diphenol | Diglycidyl ether | Patent reference |
|---|---|---|---|
| 1A | $CH_2(C_6H_4OH)_2$ | Di(epoxypropoxyphenyl)methane | 2,506,486 |
| 2A | $CH_3CH(C_6H_4OH)_2$ | Di(epoxypropoxyphenyl)methylmethane | 2,506,486 |
| 3A | $(CH_3)_2C(C_6H_4OH)_2$ | Di(epoxypropoxyphenyl)dimethylmethane | 2,506,486 |
| 4A | $C_2H_5C(CH_3)(C_6H_4OH)_2$ | Di(epoxypropoxyphenyl)ethylmethylmethane | 2,506,486 |
| 5A | $(C_2H_5)_2C(C_6H_4OH)_2$ | Di(epoxypropoxyphenyl)diethylmethane | 2,506,486 |
| 6A | $CH_3C(C_3H_7)(C_6H_4OH)_2$ | Di(eopxypropoxyphenyl)methylpropylmethane | 2,506,486 |
| 7A | $CH_3C(C_6H_5)(C_6H_4OH)_2$ | Di(epoxypropoxyphenyl)methylphenylmethane | 2,506,486 |
| 8A | $C_2H_5C(C_6H_5)(C_6H_4OH)_2$ | Di(epoxypropoxyphenyl)ethylphenylmethane | 2,506,486 |
| 9A | $C_3H_7C(C_6H_5)(C_6H_4OH)_2$ | Di(epoxypropoxyphenyl)propylphenylmethane | 2,506,486 |
| 10A | $C_4H_9C(C_6H_5)(C_6H_4OH)_2$ | Di(epoxypropoxyphenyl)butylphenylmethane | 2,506,486 |
| 11A | $(CH_3C_6H_4)CH(C_6H_4OH)_2$ | Di(epoxypropoxyphenyl)tolylmethane | 2,506,486 |
| 12A | $(CH_3C_6H_4)C(CH_3)(C_6H_4OH)_2$ | Di(epoxypropoxyphenyl)tolylmethylmethane | 2,506,486 |
| 13A | Dihydroxy diphenyl | 4,4'-bis(2,3-epoxypropoxy)diphenyl | 2,530,353 |
| 14A | $(CH_3)C(C_4H_5.C_6H_3OH)_2$ | 2,2-bis(4-(2,3-epoxypropoxy)2-tertiarybutyl phenyl)propane | 2,530,353 |

PART 3

Subdivision A

The preparations of the diepoxy derivatives of the diphenols, which are sometimes referred to as diglycidyl ethers, have been described in a number of patents. For

Subdivision B

As to the preparation of low-molal polymeric epoxides or mixtures reference is made to aforementioned U. S. Patents Nos. 2,575,558 and 2,582,985.

In light of U. S. Patent No. 2,575,558, the following examples can be specified by reference to the formula therein provided one still bears in mind it is in essence an over-simplification.

TABLE II

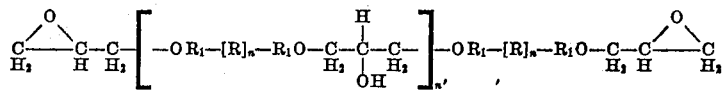

(in which the characters have their previous significance)

| Example number | —R₄O— from HR₁OH | —R— | n | n' | Remarks |
|---|---|---|---|---|---|
| B1 | Hydroxy benzene | $-\underset{\underset{CH_3}{\mid}}{\overset{\overset{CH_3}{\mid}}{C}}-$ | 1 | 0, 1, 2 | Phenol known as bis-phenol A. Low polymeric mixture about ⅔ or more where n'=0, remainder largely where n'=1, some where n'=2. |
| B2 | ___do___ | $-\underset{\underset{CH_3}{\mid}}{\overset{\overset{CH_3}{\mid}}{C}}-$ CH₃ | 1 | 0, 1, 2 | Phenol known as bis-phenol B. See note regarding B1 above. |
| B3 | Orthobutylphenol | $-\underset{\underset{CH_3}{\mid}}{\overset{\overset{CH_3}{\mid}}{C}}-$ | 1 | 0, 1, 2 | Even though n' is preferably 0, yet the usual reaction product might well contain materials where n' is 1, or to a lesser degree 2. |
| B4 | Orthoamylphenol | $-\underset{\underset{CH_3}{\mid}}{\overset{\overset{CH_3}{\mid}}{C}}-$ | 1 | 0, 1, 2 | Do. |
| B5 | Orthooctylphenol | $-\underset{\underset{CH_3}{\mid}}{\overset{\overset{CH_3}{\mid}}{C}}-$ | 1 | 0, 1, 2 | Do. |
| B6 | Orthononylphenol | $-\underset{\underset{CH_3}{\mid}}{\overset{\overset{CH_3}{\mid}}{C}}-$ | 1 | 0, 1, 2 | Do. |
| B7 | Orthododecylphenol | $-\underset{\underset{CH_3}{\mid}}{\overset{\overset{CH_3}{\mid}}{C}}-$ | 1 | 0, 1, 2 | Do. |

TABLE II (continued)

| Example number | —R₁O— from HR₁OH | —R— | n | n' | Remarks |
|---|---|---|---|---|---|
| B8 | Metacresol | $-\overset{\overset{\displaystyle CH_3}{\mid}}{\underset{\underset{\displaystyle CH_3}{\mid}}{C}}-$ | 1 | 0, 1, 2 | See prior note. This phenol used as initial material is known as bis-phenol C. For other suitable bis-phenols see U. S. Patent 2,564,191. |
| B9 | do | $-\overset{\overset{\displaystyle CH_3}{\mid}}{\underset{\underset{\underset{\displaystyle CH_3}{\mid}}{\displaystyle CH_2}}{\mid}}C-$ | 1 | 0, 1, 2 | See prior note. |
| B10 | Dibutyl (ortho-para) phenol | $-\overset{\overset{\displaystyle H}{\mid}}{\underset{\underset{\displaystyle H}{\mid}}{C}}-$ | 1 | 0, 1, 2 | Do. |
| B11 | Diamyl (ortho-para) phenol | $-\overset{\overset{\displaystyle H}{\mid}}{\underset{\underset{\displaystyle H}{\mid}}{C}}-$ | 1 | 0, 1, 2 | Do. |
| B12 | Dioctyl (ortho-para) phenol | $-\overset{\overset{\displaystyle H}{\mid}}{\underset{\underset{\displaystyle H}{\mid}}{C}}-$ | 1 | 0, 1, 2 | Do. |
| B13 | Dinonyl (ortho-para) phenol | $-\overset{\overset{\displaystyle H}{\mid}}{\underset{\underset{\displaystyle H}{\mid}}{C}}-$ | 1 | 0, 1, 2 | Do. |
| B14 | Diamyl (ortho-para) phenol | $-\overset{\overset{\displaystyle H}{\mid}}{\underset{\underset{\displaystyle CH_3}{\mid}}{C}}-$ | 1 | 0, 1, 2 | Do. |
| B15 | do | $-\overset{\overset{\displaystyle H}{\mid}}{\underset{\underset{\displaystyle C_2H_5}{\mid}}{C}}-$ | 1 | 0, 1, 2 | Do. |
| B16 | Hydroxy benzene | $-\overset{\overset{\displaystyle O}{\mid}}{\underset{\underset{\displaystyle O}{\mid}}{S}}-$ | 1 | 0, 1, 2 | Do. |
| B17 | Diamyl phenol (ortho-para) | —S—S— | 1 | 0, 1, 2 | Do. |
| B18 | do | —S— | 1 | 0, 1, 2 | Do. |
| B19 | Dibutyl phenol (ortho-para) | $-\overset{\overset{\displaystyle H}{\mid}}{\underset{\underset{\displaystyle H}{\mid}}{C}}-\overset{\overset{\displaystyle H}{\mid}}{\underset{\underset{\displaystyle H}{\mid}}{C}}-$ | 1 | 0, 1, 2 | Do. |
| B20 | do | $-\overset{\overset{\displaystyle H}{\mid}}{\underset{\underset{\displaystyle H}{\mid}}{C}}-\overset{\overset{\displaystyle H}{\mid}}{\underset{\underset{\displaystyle H}{\mid}}{C}}-$ | 1 | 0, 1, 2 | Do. |
| B21 | Dinonylphenol (ortho-para) | $-\overset{\overset{\displaystyle H}{\mid}}{\underset{\underset{\displaystyle H}{\mid}}{C}}-\overset{\overset{\displaystyle H}{\mid}}{\underset{\underset{\displaystyle H}{\mid}}{C}}-$ | 1 | 0, 1, 2 | Do. |
| B22 | Hydroxy benzene | $-\overset{\overset{\displaystyle O}{\parallel}}{C}-$ | 1 | 0, 1, 2 | Do. |
| B23 | do | None | 0 | 0, 1, 2 | Do. |
| B24 | Ortho-isopropyl phenol | $-\overset{\overset{\displaystyle CH_3}{\mid}}{\underset{\underset{\displaystyle CH_3}{\mid}}{C}}-$ | 1 | 0, 1, 2 | See prior note. (As to preparation of 4,4'-isopropylidene bis-(2-isopropylphenol) see U. S. Patent No. 2,482,748, dated Sept. 27, 1949, to Dietzler.) |
| B25 | Para-octyl phenol | —CH₂—S—CH₂— | 1 | 0, 1, 2 | See prior note. (As to preparation of the phenol sulfide see U. S. Patent No. 2,488,134, dated Nov. 15, 1949, to Mikeska et al.) |
| B26 | Hydroxybenzene | $-\overset{\overset{\displaystyle CH_3}{\mid}}{\underset{\underset{\underset{\underset{\displaystyle C_2H_5}{\mid}}{\displaystyle O}}{\displaystyle CH_2}}{\mid}}C-$ | 1 | 0, 1, 2 | See prior note. (As to preparation of the phenol sulfide see U. S. Patent No. 2,526,545.) |

Subdivision C

The prior examples have been limited largely to those in which there is no divalent linking radical, as in the case of diphenyl compounds, or where the linking radical is derived from a ketone or aldehyde, particularly a ketone. Needless to say, the same procedure is employed in converting diphenyl into a diglycidyl ether regardless of the nature of the bond between the two phenolic nuclei.

For purpose of illustration attention is directed to numerous other diphenols which can be readily converted to a suitable polyepoxide, and particularly diepoxide, reactant.

As previously pointed out the initial phenol may be substituted, and the substituent group in turn may be a cyclic group such as the phenyl group or cyclohexyl group as in the instance of cyclohexylphenol or phenylphenol.

Such substituents are usually in the ortho position and may be illustrated by a phenol of the following composition:

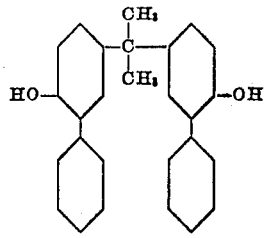

Similar phenols which are monofunctional, for instance, paraphenyl phenol or paracyclohexyl phenol with an additional substituent in the ortho position, may be employed in reactions previously referred to, for instance, with formaldehyde or sulfur chlorides to give comparable phenolic compounds having 2 hydroxyls and suitable for subsequent reaction with epichlorohydrin, etc.

Other samples include:

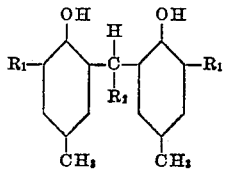

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups, and wherein said alkyl group contains at least 3 carbon atoms. See U. S. Patent No. 2,515,907.

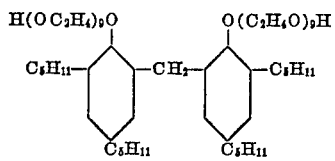

in which the —$C_5H_{11}$ groups are secondary amyl groups. See U. S. Patent No. 2,504,064.

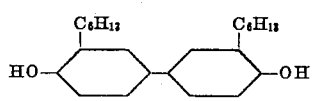

See U. S. Patent No. 2,285,563.

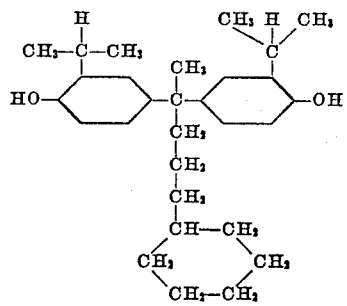

See U. S. Patent No. 2,503,196.

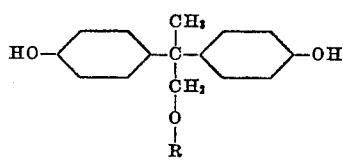

wherein R is a member of the group consisting of alkyl, and alkoxyalkyl radicals containing from 1 to 5 carbon atoms, inclusive, and aryl and chloraryl radicals of the benzene series. See U. S. Patent No. 2,526,545.

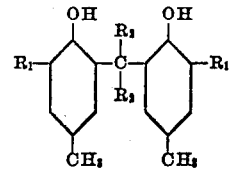

wherein $R_1$ is a substituent selected from the class consisting of secondary butyl and tertiary butyl groups and $R_2$ is a substituent selected from the class consisting of alkyl, cycloalkyl, aryl, aralkyl, and alkaryl groups. See U. S. Patent No. 2,515,906.

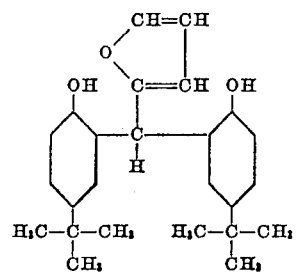

See U. S. Patent No. 2,515,908.

As to sulfides, the following compound is of interest:

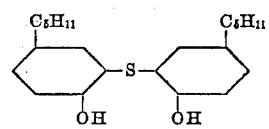

See U. S. Patent No. 2,331,448.

As to descriptions of various suitable phenol sulfides, reference is made to the following patents: U. S. Patents Nos. 2,246,321, 2,207,719, 2,174,248, 2,139,766, 2,244,021 and 2,195,539.

As to sulfones, see U. S. Patent No. 2,122,958.

As to suitable compounds obtained by the use of formaldehyde or some other aldehyde, particularly compounds such as

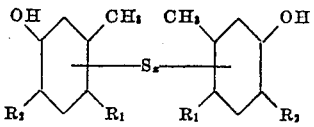

in which $R_5$ is a methylene radical, or a substituted methylene radical which represents the residue of an aldehyde and is preferably the unsubstituted methylene radical derived from formaldehyde. See U. S. Patent No. 2,430,002.

See also U. S. Patent No. 2,581,919 which describes di(dialkyl cresol) sulfides which include the monosulfides, the disulfides, and the polysulfides. The following formula represents the various dicresol sulfides of this invention;

in which $R_1$ and $R_2$ are alkyl groups, the sum of whose carbon atoms equals 6 to about 20, and $R_1$ and $R_2$ each preferably contain 3 to about 10 carbon atoms, and $x$ is 1 to 4. The term "sulfides" as used in this text, therefore, includes monosulfide, disulfide, and polysulfides.

PART 4

It is well known that one can readily purchase on the open market, or prepare, fusible, organic solvent-soluble, water-insoluble resin polymers of a composition approximated in an idealized form by the formula

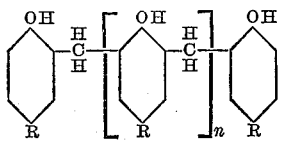

In the above formula $n$ represents a small whole number varying from 1 to 6, 7 or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substituent, generally an alkyl radical having from 4 to 15 carbon atoms, such as a butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent soluble does not mean it is necessarily soluble in any organic solvent. This is particularly true where the resins are derived from trifunctional phenols as previously noted. However, even when obtained from a difunctional phenol, for instance paraphenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated-organic solvent-soluble, water-insoluble, low-stage phenolaldehyde resins having an average molecular weight corresponding to at least 3 and not over 6 phenolic nuclei per resin molecule. These resins are difunctional only in regard to methylol-forming reactivity, are derived by reaction between a difunctional monohydric phenol and an aldehyde having not over 8 carbon atoms and reactive toward said phenol, and are formed in the substantial absence of trifunctional phenols. The phenol is of the formula

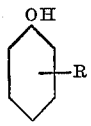

in which R is an aliphatic hydrocarbon radical having at least 4 carbon atoms and not more than 24 carbon atoms, and substituted in the 2,4,6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

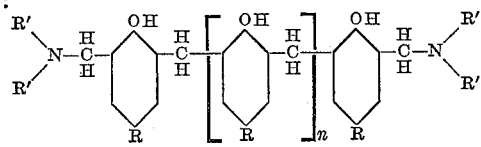

The basic nonhydroxylated amine may be designated thus:

In conducting reactions of this kind one does not necessarily obtain a hundred percent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

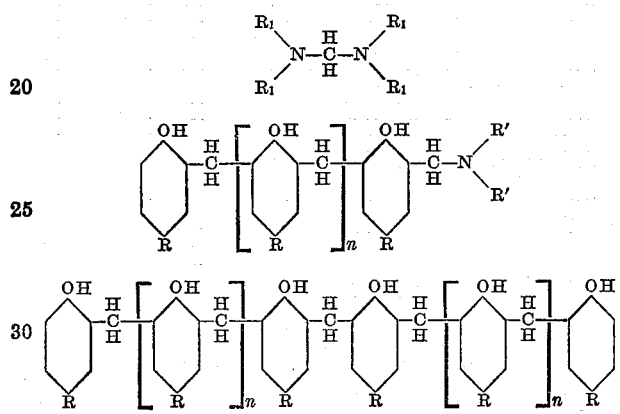

As has been pointed out previously, as far as the resin unit goes one can use a mole of aldehyde other than formaldehyde, such as acetaldehyde, propionaldehyde or butyraldehyde. The resin unit may be exemplified thus:

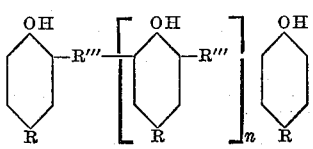

in which R''' is the divalent radical obtained from the particular aldehyde employed to form the resin. For reasons which are obvious the condensation product obtained appears to be described best in terms of the method of manufacture.

As previously stated the preparation of resins, the kind herein employed as reactants, is well known. See previously mentioned U. S. Patent 2,499,368. Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture, for instance, one approximating 4 phenolic nuclei will have some trimer and pentamer present. Thus, the molecular weight may be such that it corresponds to a fractional value for $n$ as, for example, 3.5, 4.5 or 5.2, In the actual manufacture of the resins we found no reason for using other than those which are lowest in price and most readily available commercially. For purposes of convenience suitable resins are characterized in the following table:

TABLE III

| Example number | R | Position of R | R''' derived from— | $n$ | Mol. wt. of resin molecule (based on $n+2$) |
|---|---|---|---|---|---|
| 1a | Tertiary butyl | Para | Formaldehyde. | 3.5 | 882.5 |
| 2a | Secondary butyl | Ortho | ...do | 3.5 | 882.5 |
| 3a | Tertiary amyl | Para | ...do | 3.5 | 959.5 |
| 4a | Mixed secondary and tertiary amyl | Ortho | ...do | 3.5 | 805.5 |
| 5a | Propyl | Para | ...do | 3.5 | 805.5 |
| 6a | Tertiary hexyl | ...do | ...do | 3.5 | 1,036.5 |
| 7a | Octyl | ...do | ...do | 3.5 | 1,190.5 |
| 8a | Nonyl | ...do | ...do | 3.5 | 1,267.5 |
| 9a | Decyl | ...do | ...do | 3.5 | 1,344.5 |
| 10a | Dodecyl | ...do | ...do | 3.5 | 1,498.5 |
| 11a | Tertiary butyl | ...do | Acetaldehyde. | 3.5 | 945.5 |
| 12a | Tertiary amyl | ...do | ...do | 3.5 | 1,022.5 |
| 13a | Nonyl | ...do | ...do | 3.5 | 1,330.5 |
| 14a | Tertiary butyl | ...do | Butyraldehyde. | 3.5 | 1,071.5 |
| 15a | Tertiary amyl | ...do | ...do | 3.5 | 1,148.5 |
| 16a | Nonyl | ...do | ...do | 3.5 | 1,456.5 |
| 17a | Tertiary butyl | ...do | Propionaldehyde. | 3.5 | 1,008.5 |
| 18a | Tertiary amyl | ...do | ...do | 3.5 | 1,085.5 |
| 19a | Nonyl | ...do | ...do | 3.5 | 1,393.5 |
| 20a | Tertiary butyl | ...do | Formaldehyde. | 4.2 | 996.6 |
| 21a | Tertiary amyl | ...do | ...do | 4.2 | 1,083.4 |
| 22a | Nonyl | ...do | ...do | 4.2 | 1,430.6 |
| 23a | Tertiary butyl | ...do | ...do | 4.8 | 1,094.4 |
| 24a | Tertiary amyl | ...do | ...do | 4.8 | 1,189.6 |
| 25a | Nonyl | ...do | ...do | 4.8 | 1,570.4 |
| 26a | Tertiary amyl | ...do | ...do | 1.5 | 604.0 |
| 27a | Hexyl | ...do | ...do | 1.5 | 653.0 |
| 28a | ......do | ...do | Acetaldehyde. | 1.5 | 688.0 |
| 29a | Octyl | ...do | ...do | 1.5 | 786.0 |
| 30a | Nonyl | ...do | ...do | 1.5 | 835.0 |
| 31a | Octyl | ...do | Butyraldehyde. | 2.0 | 986.0 |
| 32a | Nonyl | ...do | ...do | 2.0 | 1,028.0 |
| 33a | Amyl | ...do | ...do | 2.0 | 860.0 |
| 34a | Butyl | ...do | Formaldehyde. | 2.0 | 636.0 |
| 35a | Amyl | ...do | ...do | 2.0 | 692.0 |
| 36a | Hexyl | ...do | ...do | 2.0 | 748.0 |

PART 5

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are sometimes characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids such as polycarboxy acids.

Cyclic amidines obtained from oxidized wax acids are described in detail in co-pending Blair application, Serial No. 274,075, filed February 28, 1952. Instead of being derived from oxidized wax acids, the cyclic compounds herein employed may be obtained from any acid from acetic acid upward, and may be obtained from acids, such as benzoic, or acids in which there is a recurring ether linkage in the acyl radical. In essence then, with this difference said aforementioned co-pending Blair application, Serial No. 274,075, describes compounds of the following structure:

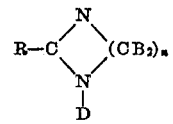

where R is a member of the class consisting of hydrocarbon radicals having up to approximately 30 carbon atoms and includes hydroxylated hydrocarbon radicals and also hydrocarbon radicals in which the carbon atom chain is interrupted by oxygen; $n$ is the numeral 2 to 3, D is a member of the class consisting of hydrogen and organic radicals containing less than 25 carbon atoms, composed of the elements from the group consisting of C, N, O and H, and B is a member of the group consisting of hydrogen and hydrocarbon radicals containing less than 7 carbon atoms, with the proviso that at least three occurrences of B are hydrogen.

The preparation of an imidazoline substituted in the two-position by lower aliphatic hydrocarbon radicals is described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form basic nitrogen-containing compounds of the present invention include polyalkylene polyamines such as ethylene-diamine, diethylenetriamine, triethylenetetramine, tetraethylenepentamine, and higher polyethylene polyamines, and also including 1,2-diaminopropane, N-ethylethylenediamine, N,N-dibutyldiethylenetriamine, 1,2-diaminobutane, hydroxyethylethylene diamine, 1,2-propylenetriamine and the like.

Equally suitable for use in preparing compounds of my invention and for the preparation of tetrahydropyrimidines substituted in the 2-position are the polamines containing at least one primary amino group and at least one secondary amino group, or another primary amino group separated from the first primary amino group by three carbon atoms. This reaction is generally carried out by heating the reactants to a temperature of 230° C. or higher, usually within the range of 250° C. to 300° C., at which temperatures water is evolved and ring closure is effected.

Examples of amine, suitable for this synthesis include 1,3-propylenediamine, trimethylenediamine, 1,3-diaminobutane, 2,4-diaminopentane, N-ethyl-trimethylenediamine, N-aminoethyl-trimethylene diamine, aminopropyl stearylamine, tripropylenetetramine, tetrapropylenepentamine, high boiling polyamines prepared by the condensation of 1,3-propylene dichloride with ammonia, and similar diamines or polyamines in which there occurs at least one primary amino group separated from another primary or secondary amino group by three carbon atoms.

From a practical standpoint, as will be explained hereinafter, the polyethylene imidazolines are most readily available and most economical for use. Thus, broadly speaking, the present invention is concerned with a condensation reaction, in which one class of reactants are substituted ring compounds of

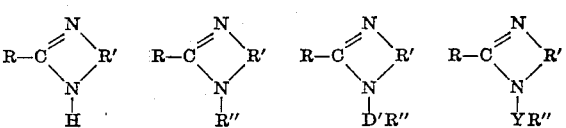

in which R' is a divalent alkylene radical of the class of

—CH₂CH₂—
—CH₂CH₂CH₂—
$$-\underset{CH_3}{\overset{H}{C}}-CH_2-$$
$$-CH_2-\underset{CH_3}{\overset{}{C}H}-CH_2-$$

and in which D' represents a divalent, non-amine, organic radical containing less than 25 carbon atoms, composed of elements including C, H, O, and n; Y represents a divalent, organic radical containing less than 25 carbon atoms, composed of elements including C, H, O, and N, and containing at least one amino group, and R includes hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R'' includes hydrogen, aliphatic radicals and cycloaliphatic radicals, with the proviso that in the occurrence of the radicals R and R'' there be present at least one group of 8 to 32 uninterrupted carbon atoms. In the present instance, however, there is no limitation in regard to the radicals R and R''.

As to the six-membered ring compounds generally referred to as substituted pyrimidines, and more particularly as substituted tetra-hydropyrimidines, see U. S. Patent No. 2,534,828, dated December 19, 1950, to Mitchell et al. With the modification as far as the instant application goes, the hydrocarbon group R may have the same variation as when it is part of the five-membered ring previously referred to and is not limited to an alkyl group having at least 10 carbon atoms as in the instance of the aforementioned U. S. Patent No. 2,534,828.

For the purpose of the present invention there is selected from the broad class of compounds previously described such members as meet the following limitations: (a) Have present at least one basic secondary amino radical; and (b) be free from primary amino groups and especially basic primary amino groups. Such compounds may have two-ring membered radicals present instead of one ring-membered radical and may or may not have present a tertiary amino radical or a hydroxyl radical, such as a hydroxy alkyl radical. A large number of compounds have been described in the literature meeting the above specifications, of which quite a few appear in the aforementioned issued U. S. Patents. Examples selected from the patents include the following:

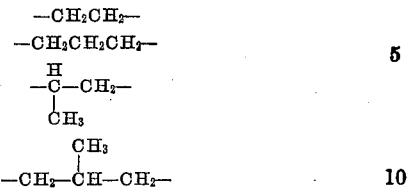

2-undecylimidazoline (1)

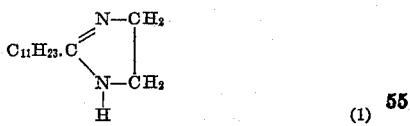

2-heptadecylimidazoline (2)

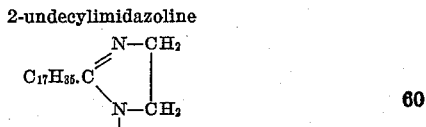

2-oleylimidazoline (3)

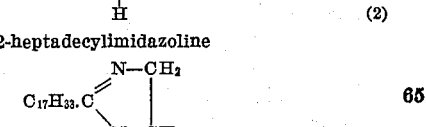

1-N-decylaminoethyl,2-ethylimidazoline (4)

2-methyl,1-hexadecylaminoethylaminoethylimidazoline (5)

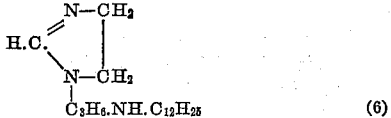

1-dodecylaminopropylimidazoline (6)

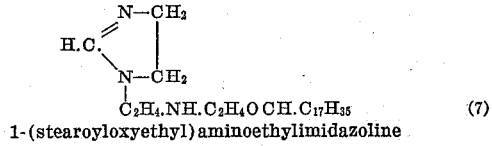

1-(stearoyloxyethyl)aminoethylimidazoline (7)

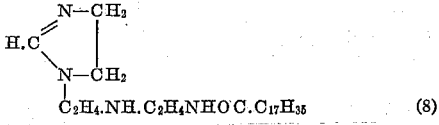

1-stearamidoethylaminoethylimidazoline (8)

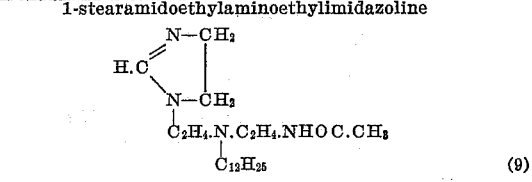

1-(N-dodecyl)-acetamidoethylaminoethylimidazoline (9)

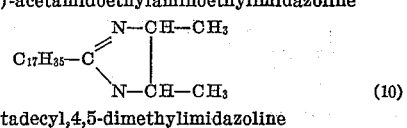

2-heptadecyl,4,5-dimethylimidazoline (10)

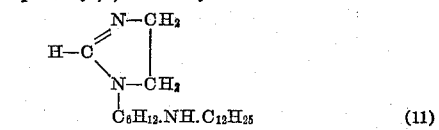

1-dodecylaminohexylimidazoline (11)

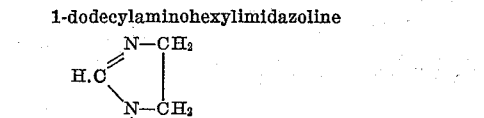

1-stearoyloxyethylaminohexylimidazoline (12)

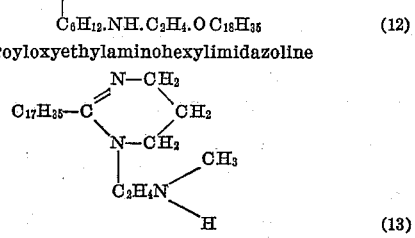

2-heptadecyl,1-methylaminoethyltetrahydropyrimidine (13)

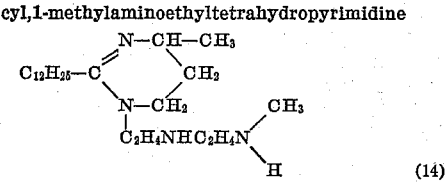

4-methyl,2-dodecyl,1-methylaminoethylaminoethyl-tetrahydropyrimidine (14)

As has been pointed out previously, the reactants herein employed may have two substituted imidazoline rings or two substituted tetrahydropyrimidine rings. Such compounds are illustrated by the following formula:

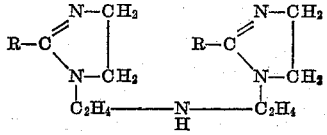

Such compounds can be derived, of course, from triethylenetetramine, tetraethylenepentamine, pentaethylenehexamine, and higher homologues. The substituents may vary depending on the source of the hydrocarbon radical, such as the lower fatty acids and higher fatty acids, a resin acid, naphthenic acid, or the like. The group introduced may or may not contain a hydroxyl radical as in the case of hydroxyacetic acid, acetic acid, ricinoleic acid, oleic acid, etc.

One advantage of a two-ring compound resides in the fact that primary amino groups which constitute the terminal radicals of the parent polyamine, whether a polyethylene amine or polypropylene amine, are converted so as to eliminate the presence of such primary amino radicals. Thus, the two-membered ring compound meets the previous specification in regard to the nitrogen-containing radicals.

Another procedure to form a two-membered ring compound is to use a dibasic acid. Suitable compounds are described, for example, in aforementioned U. S. Patent No. 2,194,419, dated March 19, 1940, to Chwala

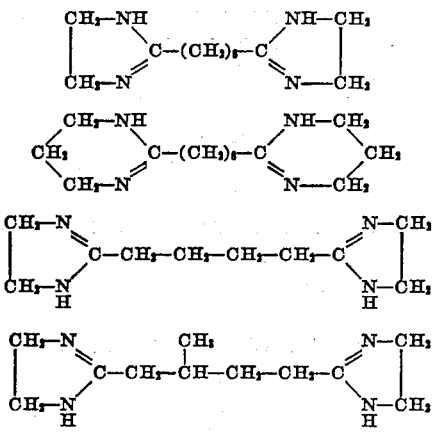

As to compounds having a tertiary amine radical, it is obvious that one can employ derivatives of polyamines in which the terminal groups are unsymmetrically alkylated. Initial polyamines of this type are illustrated by the following formula:

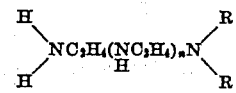

in which R represents a small alkyl radical such as methyl, ethyl, propyl, etc., and $n$ represents a small whole number greater than unity such as 2, 3 or 4. Substituted imidazolines can only be formed from that part of the polyamine which has a primary amino group present. There is no objection to the presence of a tertiary amino radical as previously pointed out. Such derivatives, provided there is more than one secondary amino radical present in the ring compound, may be reacted with an alkylene oxide, such as ethylene oxide, propylene oxide, glycide, etc., so as to convert one or more amino nitrogen radicals into the corresponding hydroxy alkyl radical, provided, however, that there is still a residual secondary amine group. For instance, in the preceding formula if $n$ represents 4 it means the ring compound would have two secondary nitrogen radicals and could be treated with a single mole of an alkylene oxide and still provide a satisfactory reactant for the herein described condensation reaction.

Ring compounds, such as substituted imidazolines, may be reacted with a substantial amount of alkylene oxide as noted in the preceding paragraph and then a secondary amino group introduced by two steps; first, reaction with an ethylene imine, and second, reaction with another mole of the oxide, or with an alkylating agent such as dimethyl sulfate, benzyl chloride, a low molal ester of a sulfonic acid, an alkyl bromide, etc.

As to oxyalkylated imidazolines and a variety of suitable high molecular weight carboxy acids which may be the source of a substituent radical, see U. S. Patent No. 2,468,180, dated April 26, 1949, to De Groote and Keiser.

Other suitable means may be employed to eliminate a terminal primary amino radical. If there is additionally a basic secondary amino radical present then the primary amino radical can be subjected to acylation notwithstanding the fact that the surviving amino group has no significant basicity. As a rule acylation takes place at the terminal primary amino group rather than at the secondary amino group, thus one can employ a compound such as

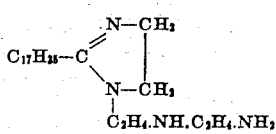

2-heptadecyl,1-diethylenediaminoimidazoline and subject it to acylation so as to obtain, for example, acetylated 2 - heptadecyl,1-diethylenediaminoimidazoline of the following structure:

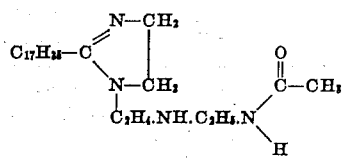

(15)

Similarly, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

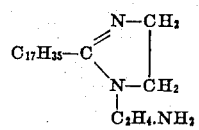

2-heptadecyl, 1-aminoethylimidazoline which can be reacted with a single mole of ethylene oxide, for example, to produce the hydroxy ethyl derivative of 2-heptadecyl,1-amino-ethylimidazoline, which can be illustrated by the following formula:

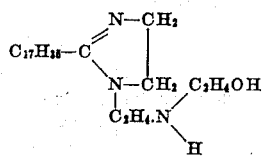

(16)

Other reactants may be employed in connection with an initial reactant of the kind described above, to wit, 2-heptadecyl,1-amino-ethylimidazoline; for instance, reaction with an alkylene imine such as ethylene imine, propylene imine, etc. If reacted with ethylene imine the net result is to convert a primary amino radical into a secondary amino radical and also introduces a new primary amino group. If ethylene imine is employed, the net result is simply to convert 2-heptadecyl,1-aminoethylimidazoline into 2 - heptadecyl,1 - diethylene - diaminoimidazoline. However, if propylene imine is used the net result is a compound which can be considered as being derived hypothetically from a mixed polyalkylene amine, i. e., one having both ethylene groups and a propylene group between nitrogen atoms.

A more satisfactory reactant is to employ one obtained by the reaction of epichlorohydrin on a secondary alkyl amine, such as the following compound:

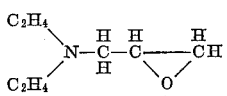

If a mole of 2-heptadecyl,1-aminoethylimidazoline is reacted with a mole of the compound just described, to wit,

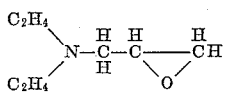

the resultant compound has a basic secondary amino group and a basic tertiary amino group. See U. S. Patent No. 2,520,093 dated August 22, 1950, to Gross.

For purpose of convenience, what has been said by direct reference is largely by way of illustration in which there is present a sizable hydrophobe group, for instance, heptadecyl groups, pentadecyl groups, octyl groups, nonyl groups, etc. etc.

As has been pointed out, one can obtain all these comparable derivatives from low molal acids, such as acetic, propionic, butyric, valeric, etc. Similarly, one can employ hydroxy acids such as glycolic acids, lactic acid, etc. Over and above this, one may employ acids which introduce a very distinct hydrophobe effect as, for example, acids prepared by the oxyethylation of a low molal alcohol, such as methyl, ethyl, propyl, or the like, to produce compounds of the formula $$R(OCH_2CH_2)_nOH$$

in which R is a low molal group, such as methyl, ethyl or propyl, and $n$ is a whole number varying from one up to 15 or 20. Such compounds can be converted into the alkoxide and then reacted with an ester of chloracetic acid, followed by saponification so as to yield compounds of the type $R(OCH_2CH_2)_nOCH_2COOH$ in which $n$ has its prior significance. Another procedure is to convert the compound into a halide ether such as in $$R(OCH_2CH_2)_nCl$$

in which $n$ has its prior significance, and then react such halide ether with sodium cyanide so as to give the corresponding nitrile $R(OCH_3CH_3)_nCN$, which can be converted into the corresponding acid, of the following composition $R(OCH_2CH_2)_nCOOH$. Such acids can also be used to produce acyl derivatives of the kind previously described in which acetic acid is used as an acylating agent.

What has been said above is intended to emphasize the fact that the nitrogen compounds herein employed can vary from those which are strongly hydrophobe in character and have a minimum hydrophobe property.

Examples of decreased hydrophobe character are exemplified by 2-methylimidazoline, 2-propylimidazoline, and 2-butylimidazoline, of the following structures:

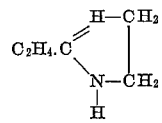

(17)

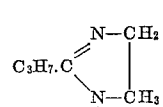

(18)

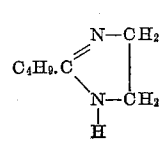

(19)

PART 6

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557, in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of the subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Indeed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively nonvolatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, para-formaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction. However, if the reaction mass is going to be subjected to some further reaction where the solvent may be objectionable, as in the case of ethyl or hexyl alcohol, and if there is to be subsequent oxyalkylation, then, obviously, the alcohol should not be used or else it should be removed. The fact that an oxygenated solvent need not be employed, of course, is an advantage for reasons stated.

The products obtained, depending on the reactants selected, may be water-insoluble or water-dispersible, or water-soluble, or close to being water-soluble. Water solubility is enhanced, of course, by making a solution in the acidified vehicle such as a dilute solution, for instance, a 5% solution of hydrochloric acid, acetic acid, hydroxyacetic acid, etc. One also may convert the finished product into salts by simply adding a stoichiometric amount of any selected acid and removing any water present by refluxing with benzene or the like. In fact, the selection of the solvent employed may depend in part whether or not the product at the completion of the reaction is to be converted into a salt form.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ulitmately one must employ the higher temperature in order to obtain products of the kind herein described. If a lower temperature reaction is used initially the period is is not critical, in fact, it may be anything from a few hours up to 24 hours. We have not found any case where it was necessary or even desirable to hold the low temperature stage for more than 24 hours. In fact, we are not convinced there is any advantage in holding it at this stage for more than 3 or 4 hours at the most. This, again, is a matter of convience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely dissolved. However, if the resin is prepared as such it may be added in solution form, just as preparation is described in aforementioned U. S. Patent 2,499,368. After the resin is in complete solution the polyamine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out we prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, forming takes place, and other mechanical or chemical difficulties are involved. We have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a lower temperature, for instance, after holding the reaction mass with or without stirring, depending on whether or not it is homogeneous, at 30° or 40° C. for 4 or 5 hours, or at the most, up to 10–24 hours, we then complete the reaction by raising the temperature up to 150° C., or thereabouts as required. The initial low temperature procedure can be eliminated or reduced to merely the shorest period of time which avoids loss of polyamine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C. by eliminating the solvent or part of the solvent so the reaction mass stays within this predetermined range. This period of heating and refluxing, after the water is eliminated, is continued until the reaction mass is homoeneous and then for one to three hours longer. The removal of the solvents is conducted in a conventional manner in the same way as the removal of solvents in resin manufacture as described in aforementioned U. S. Patent No. 2,499,368.

Needless to say, as far as the ratio of reactants goes we have invariably employed approximately one mole of the resin based on the molecular weight of the resin molecule, 2 moles of the secondary polyamine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of the nitrogen compound, and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously, little more need be said as to the actual procedure employed for the preparation of the herein described condensation products. The following example will serve by way of illustration:

*Example 1b*

The phenol-aldehyde resin is the one that has been identified previously as Example 1a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei excluding the 2 external nuclei, or 5 and 6 overall nuclei. The resin so obtained in a neutral state had a light amber color.

882 grams of the resin identified as 1a, preceding were powdered and mixed with a somewhat lesser amount of xylene, i. e., 600 grams. The mixture was refluxed until solution was complete. It was then adjusted to approximately 35° C. and 612 grams of 2-oleylimidazoline, previously shown in a structural formula as ring compound (3), were added. The mixture was stirred vigorously and formaldehyde added slowly. In this particular case the formaldehyde used was a 37% solution and 162 grams were added in approximately 3 hours. The mixture was stirred vigorously and kept within a range of approximately 40° to 44° C., for about 16½ hours. At the end of this time it was refluxed, using a phase-separating trap and a small amount of aqueous distillate withdrawn from time to time. The presence of unreacted formaldehyde was noted. Any unreacted formaldehyde seemed to disappear in approximately three hours after refluxing started. As soon as the odor of formaldehyde was no longer detectable the phase-separating trap was set so as to eliminate all the water of solution and reaction. After the water was eliminated part of the xylene was removed until the temperature reached approximately 148° C. The mass was kept at this higher temperature for 3 or 4 hours. During this time any additional water, which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a thick sticky fluid or tacky resin. The overall reaction time was approximately 30 hours. In other examples it varied from as little as 24 hours up to approximately 38 hours. The time can be reduced by cutting the low temperature period to approximately 3 to 6 hours. Note that in Table IV following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table IV.

TABLE IV

| Ex. No. | Resin used | Amt., grs. | Amine used | Amt. of amine, grams | Strength of formaldehyde soln. and amt. | Solvent used and amt. | Reaction temp., °C. | Reaction time (hrs.) | Max. distill. temp., °C. |
|---|---|---|---|---|---|---|---|---|---|
| 1b | 1a | 882 | Amine 3 | 612 | 37%, 162 g | Xylene, 600 g | 20-25 | 30 | 148 |
| 2b | 3a | 480 | ----do---- | 306 | 37%, 81 g | Xylene, 450 g | 21-23 | 24 | 145 |
| 3b | 8a | 633 | ----do---- | 306 | ----do---- | Xylene, 600 g | 20-22 | 28 | 150 |
| 4b | 1a | 441 | Amine 4 | 281 | 30%, 100 g | Xylene, 400 g | 22-24 | 28 | 148 |
| 5b | 3a | 480 | ----do---- | 281 | ----do---- | Xylene, 450 g | 21-23 | 30 | 148 |
| 6b | 8a | 633 | ----do---- | 281 | 37%, 81 g | Xylene, 600 g | 21-25 | 26 | 146 |
| 7b | 1a | 441 | Amine 5 | 394 | ----do---- | Xylene, 400 g | 23-28 | 26 | 147 |
| 8b | 3a | 480 | ----do---- | 394 | ----do---- | Xylene, 450 g | 22-26 | 26 | 146 |
| 9b | 8a | 633 | ----do---- | 394 | ----do---- | Xylene, 600 g | 21-25 | 38 | 150 |
| 10b | 11a | 473 | Amine 13 | 379 | 30%, 100 g | Xylene, 450 g | 20-24 | 36 | 149 |
| 11b | 12a | 511 | ----do---- | 379 | ----do---- | Xylene, 500 g | 21-22 | 24 | 142 |
| 12b | 13a | 665 | ----do---- | 379 | ----do---- | Xylene, 650 g | 20-21 | 26 | 145 |
| 13b | 1a | 441 | Amine 16 | 395 | 38%, 81 g | Xylene, 425 g | 22-28 | 28 | 146 |
| 14b | 3a | 480 | ----do---- | 395 | 37%, 81 g | Xylene, 450 g | 23-30 | 27 | 150 |
| 15b | 7a | 595 | ----do---- | 395 | ----do---- | Xylene, 550 g | 20-24 | 29 | 147 |
| 16b | 1a | 441 | Amine 17 | 99 | ----do---- | Xylene, 440 g | 20-21 | 30 | 148 |
| 17b | 3a | 480 | ----do---- | 99 | ----do---- | Xylene, 480 g | 21-26 | 32 | 146 |
| 18b | 12a | 511 | ----do---- | 99 | ----do---- | Xylene, 600 g | 21-23 | 26 | 147 |
| 19b | 20a | 498 | Amine 18 | 113 | ----do---- | Xylene, 500 g | 21-32 | 29 | 150 |
| 20b | 21a | 542 | ----do---- | 113 | ----do---- | ----do---- | 21-30 | 32 | 150 |
| 21b | 23a | 547 | ----do---- | 113 | ----do---- | Xylene, 550 g | 21-23 | 37 | 150 |
| 22b | 1a | 441 | Amine 19 | 126 | ----do---- | Xylene, 440 g | 20-22 | 30 | 150 |
| 23b | 24a | 595 | ----do---- | 126 | ----do---- | Xylene, 600 g | 20-25 | 36 | 149 |
| 24b | 25a | 391 | ----do---- | 126 | 30%, 50 g | Xylene, 400 g | 20-24 | 32 | 152 |

The amine numbers referred to are the ring compounds identified previously by number in Part 5.

PART 7

In preparing oxyalkylated derivatives of products of the kind which appear as examples in Part 3, we have found it particularly advantageous to use laboratory equipment which permits continuous oxypropylation and oxyethylation. The oxyethylation step is, of course, the same as the oxypropylation step insofar that two low boiling liquids are handled in each instance. The oxyalkylation step is carried out in a manner which is substantially conventional for the oxyalkylation of compounds having labile hydrogen atoms, and for that reason a detailed description of the procedure is omitted and the process will simply be illustrated by the following examples:

*Example 1c*

The oxyalkylation-susceptible compound employed is the one previously described and designated as Example 1b. Condensate 1b was in turn obtained from 2-oleylimidazoline and the resin previously identified as Example 1a. Reference to Table III shows that this particular resin is obtained from paratertiarybutylphenol and formaldehyde. 15.18 pounds of this resin condensate were dissolved in 6 pounds of solvent (xylene) along with 1.0 pounds of finely powdered caustic soda as a catalyst. Adjustment was made in the autoclave to operate at a temperature of approximately 125° C. to 135°

C., and at a pressure of about 20 to 25 pounds. In some subsequent examples pressures up to 35 pounds were employed.

The time regulator was set so as to inject the ethylene oxide in approximately three-quarters of an hour and then continue stirring for 15 minutes or longer, a total time of one hour. The reaction went readily, and, as a matter of fact, the oxide was taken up almost immediately. The speed of reaction, particularly at the low pressure, undoubtedly was due in a large measure to excellent agitation and also to the comparatively high concentration of catalyst. The amount of ethylene oxide introduced was equal in weight to the initial condensation product, to wit, 15.18 pounds. This represented a molal ratio of 34.5 moles of ethylene oxide per mole of condensate.

The theoretical molecular weight at the end of the reaction period was 3036. A comparatively small sample, less than 50 grams, was withdrawn merely for examination as far as solubility or emulsifying power was concerned and also for the purpose of making some tests on various oil field emulsions. The amount withdrawn was so small that no cognizance of this fact is included in the data, or subsequent data, or in the data presented in tabular form in subsequent Tables V and VI.

The size of the autoclave employed was 25 gallons. In innumerable comparable oxyalkylations we have withdrawn a substantial portion at the end of each step and continued oxyalkylation on a partial residual sample. This was not the case in this particular series. Certain examples were duplicated as hereinafter noted and subjected to oxyalkylation with a different oxide.

*Example 2c*

This example simply illustrates the further oxyalkylation of Example 1c, preceding. As previously stated, the oxyalkylation-susceptible compound, to wit, Example 1b, present at the beginning of the stage was obviously the same as at the end of the prior stage (Example 1c), to wit, 15.18 pounds. The amount of oxide present in the initial step was 15.18 pounds, the amount of catalyst remained the same, to wit, 1.0 pound, and the amount of solvent remained the same. The amount of oxide added was another 15.18 pounds, all addition of oxide in these various stages being based on the addition of this particular amount. Thus, at the end of the oxyethylation step the amount of oxide added was a total of 30.36 pounds and the molal ratio of ethylene oxide to resin condensate was 69.0 to 1.0. The theoretical molecular weight was 3348.

The maximum temperature during the operation was 125° C. to 130° C. The maximum pressure was in the range of 20 to 25 pounds. The time period was one and one-half hours.

*Example 3c*

The oxyethylation proceeded in the same manner described in Examples 1c and 2c. There was no added solvent and no added catalyst. The oxide added was 15.18 pounds and the total oxide at the end of the oxyethylation step was 45.54 pounds. The molal ratio of oxide to condensate was 103.5 to 1. Conditions as far as temperature and pressure and time were concerned were all the same as in Example 1c and 2c. The time period was somewhat longer than in previous examples, to wit, 3 hours.

*Example 4c*

The oxyethylation was continued and the amount of oxide added again was 15.18 pounds. There was no added catalyst and no added solvent. The theoretical molecular weight at the end of the reaction period was 6072. The molal ratio of oxide to condensate was 138.0 to 1. Conditions as far as temperature and pressure were concerned were the same as in previous examples. The time period was slightly longer, to wit, 3½ hours. The reaction unquestionably began to slow up somewhat.

*Example 5c*

The oxyethylation continued with the introduction of another 15.18 pounds of ethylene oxide. No more solvent was introduced but .3 pound caustic soda was added. The theoretical molecular weight at the end of the agitation period was 9108, and the molal ratio of oxide to resin condensate was 172.5 to 1. The time period, however, dropped to 3 hours. Operating temperature and pressure remained the same as in the previous example.

*Example 6c*

The same procedure was followed as in the previous examples. The amount of oxide added was another 15.18 pounds, bringing the total oxide introduced to 91.08 pounds. The temperature and pressure during this period were the same as before. There was no added solvent. The time period was 3½ hours. Molal ratio of oxide to resin condensate was 207.0 to one.

*Example 7c*

The same procedure was followed as in the previous six examples without the addition of more caustic or more solvent. The total amount of oxide introduced at the end of the period was 106.26 pounds. The theoretical molecular weight at the end of the oxyalkylation period was 12,144. The time required for the oxyethylation was a bit longer than in the previous step, to wit, 4 hours.

*Example 8c*

This was the final oxyethylation in this particular series. There was no added solvent and no added catalyst. The total amount of oxide added at the end of this step was 121.44 pounds. The theoretical molecular weight was 13,662. The molal ratio of oxide to resin condensate was 276.0 to one. Conditions as far as temperature and pressure were concerned were the same as in the previous examples and the time required for oxyethylation was 4 hours.

The same procedure as described in the previous examples was employed in connection with a number of the other condensates described previously. All these data have been presented in tabular form in a series of four tables, Tables V and VI, VII and VIII.

In substantially every case a 25-gallon autoclave was employed, although in some instances the initial oxyethylation was started in a 15-gallon autoclave and then transferred to a 25-gallon autoclave. This is immaterial but happened to be a matter of convenience only. The solvent used in all cases was xylene. The catalyst used was finely powdered caustic soda.

Referring now to Tables V and VI, it will be noted that compounds 1c through 40c were obtained by the use of ethylene oxide, whereas 41c through 80c were obtained by the use of propylene oxide alone.

Thus, in reference to Table V it is to be noted as follows:

The example number of each compound is indicated in the first column.

The identity of the oxyalkylation-susceptible compound, to wit, the resin condensate, is indicated in the second column.

The amount of condensate is shown in the third column.

Assuming that ethylene oxide alone is employed, as happens to be the case in Examples 1c through 40c, the amount of oxide present in the oxyalkylation derivative is shown in column 4, although in the initial step since no oxide is present there is a blank.

When ethylene oxide is used exclusively the 5th column is blank.

The 6th column shows the amount of powdered caustic soda used as a catalyst, and the 7th column shows the amount of solvent employed.

The 15th column shows the theoretical molecular weight at the end of the oxyalkylation period.

The 18th column states the amount of condensate present in the reaction mass at the end of the period.

As pointed out previously, in this particular series the amount of reaction mass withdrawn for examination was so small that it was ignored and for this reason the resin condensate in column 8 coincides with the figure in column 3.

Column 9 shows the amount of ethylene oxide employed in the reaction mass at the end of the particular period.

Column 10 can be ignored insofar that no propylene oxide was employed.

Column 11 shows the catalyst at the end of the reaction period.

Column 12 shows the amount of solvent at the end of the reaction period.

Column 13 shows the molal ratio of ethylene oxide to condensate.

Column 14 can be ignored for the reason that no propylene oxide was employed.

Referring now to Table VIII. It is to be noted that the first column refers to Examples 1c, 2c, 3c, etc.

The second column gives the maximum temperature employed during the oxyalkylation step and the third column gives the maximum pressure.

The fourth column gives the time period employed.

The last three columns shows solubility tests by shaking a small amount of the compound, including the solvent present, with several volumes of water, xylene and kerosene. It sometimes happens that although xylene in comparatively small amounts will dissolve in the concentrated material when the concentrated material in turn is diluted with xylene separation takes place.

Referring to Table VI, Examples 41c through 80c are the counterparts of Examples 1c through 40c, except that the oxide employed is propylene oxide instead of ethylene oxide. Therefore, as explained previously, two columns are blank, to wit, columns 4 and 9.

Reference is now made to Table VII. It is to be noted these compounds are designated by "d" numbers, 1d, 2d, 3d, etc., through and including 32d. They are derived, in turn, from compounds in the "c" series, for example, 36c, 40c, 54c, and 76c. These compounds involve the use of both ethylene oxide and propylene oxide. Since compounds 1c through 40c were obtained by the use of ethylene oxide, it is obvious that those obtained from 36c and 40c, involve the use of ethylene oxide first, and propylene oxide afterward. Inversely, those compounds obtained from 54c and 76c obviously come from a prior series in which propylene oxide was used first.

In the preparation of this series indicated by the small letter "d," as 1d, 2d, 3d, etc., the initial "c" series such as 36c, 40c, 54c, and 76c, were duplicated and the oxyalkylation stopped at the point designated instead of being carried further as may have been the case in the original oxyalkylation step. Then oxyalkylation proceeded by using the second oxide as indicated by the previous explanation, to wit, propylene oxide in 1d through 16d, and ethylene oxide in 17d through 32d, inclusive.

In examining the table beginning with 1d, it will be noted that the initial product, i. e., 36c, consisted of the reaction product involving 15.18 pounds of the resin condensate, 22.27 pounds of ethylene oxide, 1.0 pounds of caustic soda, and 6.0 pounds of the solvent.

It is to be noted that reference to the catalyst in Table VII refers to the total amount of catalyst, i. e., the catalyst present from the first oxyalkylation step plus added catalyst, if any. The same is true in regard to the solvent. Reference to the solvent refers to the total solvent present, i. e., that from the first oxyalkylation step plus added solvent, if any.

In this series, it will be noted that the theoretical molecular weights are given prior to the oxyalkylation step and after the oxyalkylation step, although the value at the end of one step is the value at the beginning of the next step, except obviously at the very start the value depends on the theoretical molecular weight at the end of the initial oxyalkylation step; i. e., oxyethylation for 1d through 16d, and oxypropylation for 17d through 32d.

It will be noted also that under the molal ratio the values of both oxides to the resin condensate are included.

The data given in regard to the operating conditions is substantially the same as before and appears in Table VIII.

The products resulting from these procedures may contain modest amounts, or have small amounts, of the solvents as indicated by the figures in the tables. If desired the solvent may be removed by distillation, and particularly vacuum distillation. Such distillation also may remove traces or small amounts of uncombined oxide, if present and volatile under the conditions employed.

Obviously, in the use of ethylene oxide and propylene oxide in combination one need not first use one oxide and then the other, but one can mix the two oxides and thus obtain what may be termed an indifferent oxyalkylation, i. e., no attempt to selectively add one and then the other, or any other variant.

Needless to say, one could start with ethylene oxide and then use propylene oxide, and then go back to ethylene oxide; or, inversely, start with propylene oxide, then use ethylene oxide, and then go back to propylene oxide; or, one could use a combination in which butylene oxide is used along with either one of the two oxides just mentioned, or a combination of both of them.

The colors of the products usually vary from a reddish amber tint to a definitely red, and amber. The reason is primarily that no effort is made to obtain colorless resins initially and the resins themselves may be yellow, amber, or even dark amber. Condensation of a nitrogenous product invariably yields a darker product than the original resin and usually has a reddish color. The solvent employed, if xylene, adds nothing to the color but one may use a darker colored aromatic petroleum solvent. Oxyalkylation generally tends to yield lighter colored products and the more oxide employed the lighter the color of the product. Products can be prepared in which the final color is a lighter amber with a reddish tint. Such products can be decolorized by the use of clays, bleaching chars, etc. As far as use in demulsification is concerned, or some other industrial uses, there is no justification for the cost of bleaching the product.

Generally speaking, the amount of alkaline catalyst present is comparatively small and it need not be removed. Since the products per se are alkaline due to the presence of a basic nitrogen, the removal of the alkaline catalyst is somewhat more difficult than ordinarily is the case for the reason that if one adds hydrochloric acid, for example, to neutralize the alkalinity one may partially neutralize the basic nitrogen radical also. The preferred procedure is to ignore the presence of the alkali unless it is objectionable or else add a stoichiometric amount of concentrated hydrochloric acid equal to the caustic soda present.

TABLE V

| Ex. No. | Composition before ||||| | Composition at end ||||| | Molal ratio || Molec. wt. based on theoretical value |
|---|---|---|---|---|---|---|---|---|---|---|---|---|---|---|
| | O–S* cmpd., ex. No. | O–S* cmpd., lbs. | Ethl. oxide, lbs. | Propl. oxide, lbs. | Catalyst, lbs. | Solvent, lbs. | O–S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 1c | 1b | 15.18 | -------- | -------- | 1.5 | 6.0 | 15.18 | 15.18 | -------- | 1.5 | 6.0 | 34.5 | -------- | 3,036 |
| 2c | 1b | 15.18 | 15.18 | -------- | 1.5 | 6.0 | 15.18 | 30.36 | -------- | 1.5 | 6.0 | 69.0 | -------- | 4,554 |
| 3c | 1b | 15.18 | 30.36 | -------- | 1.5 | 6.0 | 15.18 | 45.54 | -------- | 1.5 | 6.0 | 103.5 | -------- | 6,072 |
| 4c | 1b | 15.18 | 45.54 | -------- | 1.5 | 6.0 | 15.18 | 60.72 | -------- | 1.5 | 6.0 | 138.0 | -------- | 7,590 |
| 5c | 1b | 15.18 | 60.72 | -------- | 1.3 | 6.0 | 15.18 | 75.90 | -------- | 1.3 | 6.0 | 172.5 | -------- | 9,108 |
| 6c | 1b | 15.18 | 75.90 | -------- | 1.3 | 6.0 | 15.18 | 91.08 | -------- | 1.3 | 6.0 | 207.0 | -------- | 10,626 |
| 7c | 1b | 15.18 | 91.08 | -------- | 1.3 | 6.0 | 15.18 | 106.26 | -------- | 1.3 | 6.0 | 241.5 | -------- | 12,144 |
| 8c | 1b | 15.18 | 106.26 | -------- | 1.3 | 6.0 | 15.18 | 121.44 | -------- | 1.3 | 6.0 | 276.0 | -------- | 13,662 |
| 9c | 5b | 15.46 | -------- | -------- | 1.5 | 4.5 | 15.46 | 15.46 | -------- | 1.5 | 4.5 | 35.2 | -------- | 3,092 |
| 10c | 5b | 15.46 | 15.46 | -------- | 1.5 | 4.5 | 15.46 | 30.92 | -------- | 1.5 | 4.5 | 70.4 | -------- | 4,638 |
| 11c | 5b | 15.46 | 30.92 | -------- | 1.5 | 4.5 | 15.46 | 46.38 | -------- | 1.5 | 4.5 | 105.6 | -------- | 6,184 |
| 12c | 5b | 15.46 | 46.38 | -------- | 1.5 | 4.5 | 15.46 | 61.84 | -------- | 1.5 | 4.5 | 140.8 | -------- | 7,730 |
| 13c | 5b | 15.46 | 61.84 | -------- | 1.3 | 4.5 | 15.46 | 77.30 | -------- | 1.5 | 4.5 | 176.0 | -------- | 9,276 |
| 14c | 5b | 15.46 | 77.30 | -------- | 1.3 | 4.5 | 15.46 | 92.76 | -------- | 1.5 | 4.5 | 211.2 | -------- | 10,822 |
| 15c | 5b | 15.46 | 92.76 | -------- | 1.3 | 4.5 | 15.46 | 108.22 | -------- | 1.5 | 4.5 | 246.4 | -------- | 12,368 |
| 16c | 5b | 15.46 | 108.22 | -------- | 1.3 | 4.5 | 15.46 | 123.68 | -------- | 1.5 | 4.5 | 281.6 | -------- | 13,914 |
| 17c | 14b | 17.74 | -------- | -------- | 1.0 | 4.5 | 17.74 | 17.74 | -------- | 1.0 | 4.5 | 40.4 | -------- | 3,548 |
| 18c | 14b | 17.74 | 17.74 | -------- | 1.0 | 4.5 | 17.74 | 35.48 | -------- | 1.0 | 4.5 | 80.8 | -------- | 5,392 |
| 19c | 14b | 17.74 | 35.48 | -------- | 1.0 | 4.5 | 17.74 | 53.22 | -------- | 1.0 | 4.5 | 121.2 | -------- | 7,096 |
| 20c | 14b | 17.74 | 53.22 | -------- | 1.0 | 4.5 | 17.74 | 70.96 | -------- | 1.0 | 4.5 | 161.6 | -------- | 8,870 |
| 21c | 14b | 17.74 | 70.96 | -------- | 1.5 | 4.5 | 17.74 | 88.70 | -------- | 1.0 | 4.5 | 202.0 | -------- | 10,644 |
| 22c | 14b | 17.74 | 88.70 | -------- | 1.5 | 4.5 | 17.74 | 106.44 | -------- | 1.0 | 4.5 | 242.4 | -------- | 12,418 |
| 23c | 14b | 17.74 | 106.44 | -------- | 1.5 | 4.5 | 17.74 | 124.18 | -------- | 1.0 | 4.5 | 282.8 | -------- | 14,192 |
| 24c | 14b | 17.74 | 124.18 | -------- | 1.5 | 4.5 | 17.74 | 141.92 | -------- | 1.0 | 4.5 | 363.6 | -------- | 15,966 |
| 25c | 22b | 11.58 | -------- | -------- | 1.0 | 4.4 | 11.58 | 11.58 | -------- | 1.0 | 4.4 | 26.3 | -------- | 2,316 |
| 26c | 22b | 11.58 | 11.58 | -------- | 1.0 | 4.4 | 11.58 | 23.16 | -------- | 1.0 | 4.4 | 52.6 | -------- | 3,474 |
| 27c | 22b | 11.58 | 23.16 | -------- | 1.0 | 4.4 | 11.58 | 34.74 | -------- | 1.0 | 4.4 | 78.9 | -------- | 4,632 |
| 28c | 22b | 11.58 | 34.74 | -------- | 1.0 | 4.4 | 11.58 | 46.32 | -------- | 1.0 | 4.4 | 105.2 | -------- | 5,790 |
| 29c | 22b | 11.58 | 46.32 | -------- | 1.5 | 4.4 | 11.58 | 57.90 | -------- | 1.5 | 4.4 | 131.5 | -------- | 6,948 |
| 30c | 22b | 11.58 | 57.90 | -------- | 1.5 | 4.4 | 11.58 | 69.48 | -------- | 1.5 | 4.4 | 157.8 | -------- | 8,106 |
| 31c | 22b | 11.58 | 69.48 | -------- | 1.5 | 4.4 | 11.58 | 81.06 | -------- | 1.5 | 4.4 | 184.1 | -------- | 9,264 |
| 32c | 22b | 11.58 | 81.06 | -------- | 1.5 | 4.4 | 11.58 | 92.64 | -------- | 1.5 | 4.4 | 210.4 | -------- | 10,422 |
| 33c | 1b | 15.18 | -------- | -------- | 1.0 | 6.0 | 15.18 | 7.59 | -------- | 1.0 | 6.0 | 17.2 | -------- | 2,277 |
| 34c | 1b | 15.18 | 7.59 | -------- | 1.0 | 6.0 | 15.18 | 15.18 | -------- | 1.0 | 6.0 | 34.4 | -------- | 3,036 |
| 35c | 1b | 15.18 | 15.18 | -------- | 1.0 | 6.0 | 15.18 | 22.77 | -------- | 1.0 | 6.0 | 51.6 | -------- | 3,795 |
| 36c | 1b | 15.18 | 22.77 | -------- | 1.0 | 6.0 | 15.18 | 30.36 | -------- | 1.0 | 6.0 | 68.8 | -------- | 4,554 |
| 37c | 1b | 15.18 | 30.36 | -------- | 1.3 | 6.0 | 15.18 | 37.95 | -------- | 1.3 | 6.0 | 86.0 | -------- | 5,313 |
| 38c | 1b | 15.18 | 37.95 | -------- | 1.3 | 6.0 | 15.18 | 45.54 | -------- | 1.3 | 6.0 | 103.2 | -------- | 6,072 |
| 39c | 1b | 15.18 | 45.54 | -------- | 1.3 | 6.0 | 15.18 | 53.13 | -------- | 1.3 | 6.0 | 120.4 | -------- | 6,831 |
| 40c | 1b | 15.18 | 53.13 | -------- | 1.3 | 6.0 | 15.18 | 60.72 | -------- | 1.3 | 6.0 | 137.6 | -------- | 7,590 |

*Oxyalkylation-susceptible.

TABLE VI

| Ex. No. | Composition before ||||| | Composition at end ||||| | Molal ratio || Molec. wt. based on theoretical value |
|---|---|---|---|---|---|---|---|---|---|---|---|---|---|---|
| | O–S* cmpd., ex. No. | O–S* cmpd., lbs. | Ethl. oxide, lbs. | Propl. oxide, lbs. | Catalyst, lbs. | Solvent, lbs. | O–S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 41c | 1b | 15.18 | -------- | -------- | 1.1 | 6.0 | 15.18 | -------- | 15.18 | 1.1 | 6.0 | -------- | 26.2 | 3,036 |
| 42c | 1b | 15.18 | -------- | 15.18 | 1.1 | 6.0 | 15.18 | -------- | 30.36 | 1.1 | 6.0 | -------- | 52.4 | 4,554 |
| 43c | 1b | 15.18 | -------- | 30.36 | 1.1 | 6.0 | 15.18 | -------- | 45.54 | 1.1 | 6.0 | -------- | 78.6 | 6,072 |
| 44c | 1b | 15.18 | -------- | 45.54 | 1.1 | 6.0 | 15.18 | -------- | 60.72 | 1.1 | 6.0 | -------- | 104.8 | 7,590 |
| 45c | 1b | 15.18 | -------- | 60.72 | 1.1 | 6.0 | 15.18 | -------- | 75.90 | 1.1 | 6.0 | -------- | 131.0 | 10,626 |
| 46c | 1b | 15.18 | -------- | 75.90 | 1.5 | 6.0 | 15.18 | -------- | 106.26 | 1.5 | 6.0 | -------- | 183.4 | 13,662 |
| 47c | 1b | 15.18 | -------- | 106.26 | 1.5 | 6.0 | 15.18 | -------- | 136.62 | 1.5 | 6.0 | -------- | 235.8 | 16,698 |
| 48c | 1b | 15.18 | -------- | 136.62 | 1.5 | 6.0 | 15.18 | -------- | 166.98 | 1.5 | 6.0 | -------- | 288.2 | 18,216 |
| 49c | 5b | 15.46 | -------- | -------- | 1.1 | 4.5 | 15.46 | -------- | 15.46 | 1.1 | 4.5 | -------- | 26.6 | 3,092 |
| 50c | 5b | 15.46 | -------- | 15.46 | 1.1 | 4.5 | 15.46 | -------- | 30.92 | 1.1 | 4.5 | -------- | 53.2 | 4,638 |
| 51c | 5b | 15.46 | -------- | 30.92 | 1.1 | 4.5 | 15.46 | -------- | 46.38 | 1.1 | 4.5 | -------- | 79.8 | 6,184 |
| 52c | 5b | 15.46 | -------- | 46.38 | 1.1 | 4.5 | 15.46 | -------- | 61.84 | 1.1 | 4.5 | -------- | 106.4 | 7,730 |
| 53c | 5b | 15.46 | -------- | 61.84 | 1.1 | 4.5 | 15.46 | -------- | 77.30 | 1.1 | 4.5 | -------- | 133.0 | 10,822 |
| 54c | 5b | 15.46 | -------- | 77.30 | 1.5 | 4.5 | 15.46 | -------- | 108.22 | 1.5 | 4.5 | -------- | 186.2 | 13,914 |
| 55c | 5b | 15.46 | -------- | 108.22 | 1.5 | 4.5 | 15.46 | -------- | 139.14 | 1.5 | 4.5 | -------- | 238.4 | 17,006 |
| 56c | 5b | 15.46 | -------- | 139.14 | 1.5 | 4.5 | 15.46 | -------- | 170.06 | 1.5 | 4.5 | -------- | 292.6 | 18,552 |
| 57c | 14b | 17.74 | -------- | -------- | 1.2 | 4.5 | 17.74 | -------- | 17.74 | 1.2 | 4.5 | -------- | 30.6 | 3,548 |
| 58c | 14b | 17.74 | -------- | 17.74 | 1.2 | 4.5 | 17.74 | -------- | 35.48 | 1.2 | 4.5 | -------- | 61.2 | 5,322 |
| 59c | 14b | 17.74 | -------- | 35.48 | 1.2 | 4.5 | 17.74 | -------- | 53.22 | 1.2 | 4.5 | -------- | 91.8 | 7,096 |
| 60c | 14b | 17.74 | -------- | 53.22 | 1.2 | 4.5 | 17.74 | -------- | 70.96 | 1.2 | 4.5 | -------- | 122.4 | 8,870 |
| 61c | 14b | 17.74 | -------- | 70.96 | 1.2 | 4.5 | 17.74 | -------- | 88.70 | 1.2 | 4.5 | -------- | 153.0 | 12,418 |
| 62c | 14b | 17.74 | -------- | 88.70 | 1.7 | 4.5 | 17.74 | -------- | 124.18 | 1.7 | 4.5 | -------- | 214.2 | 15,966 |
| 63c | 14b | 17.74 | -------- | 124.18 | 1.7 | 4.5 | 17.74 | -------- | 159.66 | 1.7 | 4.5 | -------- | 275.4 | 19,514 |
| 64c | 14b | 17.74 | -------- | 159.66 | 1.7 | 4.5 | 17.74 | -------- | 195.14 | 1.7 | 4.5 | -------- | 336.6 | 21,288 |
| 65c | 22b | 11.58 | -------- | -------- | 1.0 | 4.4 | 11.58 | -------- | 11.58 | 1.0 | 4.4 | -------- | 19.95 | 2,316 |
| 66c | 22b | 11.58 | -------- | 11.58 | 1.0 | 4.4 | 11.58 | -------- | 23.16 | 1.0 | 4.4 | -------- | 39.90 | 3,474 |
| 67c | 22b | 11.58 | -------- | 23.16 | 1.0 | 4.4 | 11.58 | -------- | 34.74 | 1.0 | 4.4 | -------- | 59.80 | 4,632 |
| 68c | 22b | 11.58 | -------- | 34.74 | 1.0 | 4.4 | 11.58 | -------- | 46.32 | 1.0 | 4.4 | -------- | 79.80 | 5,790 |
| 69c | 22b | 11.58 | -------- | 46.32 | 1.0 | 4.4 | 11.58 | -------- | 57.90 | 1.0 | 4.4 | -------- | 99.60 | 8,106 |
| 70c | 22b | 11.58 | -------- | 57.90 | 1.5 | 4.4 | 11.58 | -------- | 81.06 | 1.5 | 4.4 | -------- | 140.0 | 10,422 |
| 71c | 22b | 11.58 | -------- | 81.06 | 1.5 | 4.4 | 11.58 | -------- | 104.22 | 1.5 | 4.4 | -------- | 180.0 | 12,738 |
| 72c | 22b | 11.58 | -------- | 104.22 | 1.5 | 4.4 | 11.58 | -------- | 127.38 | 1.5 | 4.4 | -------- | 219.9 | 13,896 |
| 73c | 1b | 15.18 | -------- | -------- | 1.0 | 6.0 | 15.18 | -------- | 7.59 | 1.0 | 6.0 | -------- | 13.15 | 2,279 |
| 74c | 1b | 15.18 | -------- | 7.59 | 1.0 | 6.0 | 15.18 | -------- | 15.18 | 1.0 | 6.0 | -------- | 26.3 | 3,036 |
| 75c | 1b | 15.18 | -------- | 15.18 | 1.0 | 6.0 | 15.18 | -------- | 22.77 | 1.0 | 6.0 | -------- | 39.45 | 3,795 |
| 76c | 1b | 15.18 | -------- | 22.77 | 1.0 | 6.0 | 15.18 | -------- | 30.36 | 1.0 | 6.0 | -------- | 52.60 | 4,554 |
| 77c | 1b | 15.18 | -------- | 30.36 | 1.0 | 6.0 | 15.18 | -------- | 37.95 | 1.0 | 6.0 | -------- | 65.75 | 5,313 |
| 78c | 1b | 15.18 | -------- | 37.95 | 1.4 | 6.0 | 15.18 | -------- | 53.13 | 1.4 | 6.0 | -------- | 92.05 | 6,831 |
| 79c | 1b | 15.18 | -------- | 53.13 | 1.4 | 6.0 | 15.18 | -------- | 68.31 | 1.4 | 6.0 | -------- | 118.35 | 8,349 |
| 80c | 1b | 15.18 | -------- | 68.31 | 1.4 | 6.0 | 15.18 | -------- | 83.49 | 1.4 | 6.0 | -------- | 144.65 | 9,867 |

*Oxyalkylation-susceptible.

TABLE VII

| Ex. No. | Composition before | | | | | | Composition at end | | | | | Molal ratio | | Molec. wt. based on theoretical value |
|---|---|---|---|---|---|---|---|---|---|---|---|---|---|---|
| | O-S* cmpd., ex. No. | O-S* cmpd., lbs. | Ethl. oxide, lbs. | Propl. oxide, lbs. | Catalyst, lbs. | Solvent, lbs. | O-S* cmpd., lbs. | Ethl. oxide, lbs. | Propl. oxide, lbs. | Catalyst, lbs. | Solvent, lbs. | Ethyl. oxide to oxyalkyl. suscept. cmpd. | Propl. oxide to oxyalkyl. suscept. cmpd. | |
| 1d | 36c | 15.18 | 30.36 | ------ | 1.0 | 6.0 | 15.18 | 30.36 | 7.59 | 1.0 | 6.0 | 68.8 | 13.10 | 5,313 |
| 2d | 36c | 15.18 | 30.36 | 7.59 | 1.0 | 6.0 | 15.18 | 30.36 | 15.18 | 1.0 | 6.0 | 68.8 | 26.15 | 6,072 |
| 3d | 36c | 15.18 | 30.36 | 15.18 | 1.0 | 6.0 | 15.18 | 30.36 | 22.77 | 1.0 | 6.0 | 68.8 | 39.20 | 6,831 |
| 4d | 36c | 15.18 | 30.36 | 22.77 | 1.0 | 6.0 | 15.18 | 30.36 | 30.36 | 1.0 | 6.0 | 68.8 | 52.3 | 7,590 |
| 5d | 36c | 15.18 | 30.36 | 30.36 | 1.0 | 6.0 | 15.18 | 30.36 | 37.95 | 1.0 | 6.0 | 68.8 | 60.5 | 8,349 |
| 6d | 36c | 15.18 | 30.36 | 37.95 | 1.0 | 6.0 | 15.18 | 30.36 | 45.54 | 1.5 | 6.0 | 68.8 | 78.6 | 9,108 |
| 7d | 36c | 15.18 | 30.36 | 45.54 | 1.5 | 6.0 | 15.18 | 30.36 | 60.72 | 1.5 | 6.0 | 68.8 | 104.8 | 10,626 |
| 8d | 36c | 15.18 | 30.36 | 60.72 | 1.5 | 6.0 | 15.18 | 30.36 | 75.90 | 1.5 | 6.0 | 68.8 | 131.8 | 12,144 |
| 9d | 40c | 15.18 | 60.72 | ------ | 1.3 | 6.0 | 15.18 | 60.72 | 7.59 | 1.3 | 6.0 | 137.6 | 13.1 | 8,349 |
| 10d | 40c | 15.18 | 60.72 | 7.59 | 1.3 | 6.0 | 15.18 | 60.72 | 15.18 | 1.3 | 6.0 | 137.6 | 26.2 | 9,108 |
| 11d | 40c | 15.18 | 60.72 | 15.18 | 1.3 | 6.0 | 15.18 | 60.72 | 30.36 | 1.3 | 6.0 | 137.6 | 52.4 | 10,626 |
| 12d | 40c | 15.18 | 60.72 | 30.36 | 1.3 | 6.0 | 15.18 | 60.72 | 45.54 | 1.3 | 6.0 | 137.6 | 78.6 | 12,144 |
| 13d | 40c | 15.18 | 60.72 | 45.54 | 1.3 | 6.0 | 15.18 | 60.72 | 60.72 | 1.8 | 6.0 | 137.6 | 104.8 | 13,662 |
| 14d | 40c | 15.18 | 60.72 | 60.72 | 1.8 | 6.0 | 15.18 | 60.72 | 68.21 | 1.8 | 6.0 | 137.6 | 117.9 | 14,421 |
| 15d | 40c | 15.18 | 60.72 | 68.21 | 1.8 | 6.0 | 15.18 | 60.72 | 75.90 | 1.8 | 6.0 | 137.6 | 131.0 | 15,180 |
| 16d | 40c | 15.18 | 60.72 | 75.90 | 1.8 | 6.0 | 15.18 | 60.72 | 91.08 | 1.8 | 6.0 | 137.6 | 157.2 | 16,698 |
| 17d | 54c | 15.46 | ------ | 108.22 | 1.5 | 4.5 | 15.46 | 3.86 | 108.22 | 1.5 | 4.5 | 8.75 | 186.2 | 14,300 |
| 18d | 54c | 15.46 | 3.86 | 108.22 | 1.5 | 4.5 | 15.46 | 7.73 | 108.22 | 1.5 | 4.5 | 17.6 | 186.2 | 14,786 |
| 19d | 54c | 15.46 | 7.73 | 108.22 | 1.5 | 4.5 | 15.46 | 15.46 | 108.22 | 1.5 | 4.5 | 35.2 | 186.2 | 15,460 |
| 20d | 54c | 15.46 | 15.46 | 108.22 | 1.5 | 4.5 | 15.46 | 23.19 | 108.22 | 1.5 | 4.5 | 52.8 | 186.2 | 16,333 |
| 21d | 54c | 15.46 | 23.19 | 108.22 | 1.5 | 4.5 | 15.46 | 30.92 | 108.22 | 1.5 | 4.5 | 70.3 | 186.2 | 17,106 |
| 22d | 54c | 15.46 | 30.92 | 108.22 | 1.5 | 4.5 | 15.46 | 38.65 | 108.22 | 1.5 | 4.5 | 87.9 | 186.2 | 17,879 |
| 23d | 54c | 15.46 | 38.63 | 108.22 | 1.5 | 4.5 | 15.46 | 46.38 | 108.22 | 1.5 | 4.5 | 105.2 | 186.2 | 18,652 |
| 24d | 54c | 15.46 | 46.38 | 108.22 | 1.5 | 4.5 | 15.46 | 54.11 | 108.22 | 1.5 | 4.5 | 123.0 | 186.2 | 19,425 |
| 25d | 76c | 15.18 | ------ | 30.36 | 1.0 | 6.0 | 15.18 | 7.59 | 30.36 | 1.0 | 6.0 | 17.25 | 52.6 | 5,313 |
| 26d | 76c | 15.18 | 7.59 | 30.36 | 1.0 | 6.0 | 15.18 | 15.18 | 30.36 | 1.0 | 6.0 | 34.50 | 52.6 | 6,072 |
| 27d | 76c | 15.18 | 15.18 | 30.36 | 1.0 | 6.0 | 15.18 | 22.77 | 30.36 | 1.0 | 6.0 | 51.75 | 52.6 | 6,831 |
| 28d | 76c | 15.18 | 22.77 | 30.36 | 1.0 | 6.0 | 15.18 | 30.36 | 30.36 | 1.0 | 6.0 | 69.0 | 52.6 | 7,590 |
| 29d | 76c | 15.18 | 30.36 | 30.36 | 1.0 | 6.0 | 15.18 | 45.54 | 30.36 | 1.5 | 6.0 | 103.0 | 52.6 | 9,108 |
| 30d | 76c | 15.18 | 45.54 | 30.36 | 1.5 | 6.0 | 15.18 | 60.72 | 30.36 | 1.5 | 6.0 | 138.2 | 52.6 | 10,626 |
| 31d | 76c | 15.18 | 60.72 | 30.36 | 1.5 | 6.0 | 15.18 | 75.90 | 30.36 | 1.5 | 6.0 | 172.2 | 52.6 | 12,144 |
| 32d | 76c | 15.18 | 75.90 | 30.36 | 1.5 | 6.0 | 15.18 | 91.08 | 30.36 | 1.5 | 6.0 | 207.0 | 52.6 | 13,662 |

*Oxyalkylation-susceptible.

TABLE VIII

| Ex. No. | Max. temp., °C. | Max. pres., p.s.i. | Time, hrs. | Solubility | | |
|---|---|---|---|---|---|---|
| | | | | Water | Xylene | Kerosene |
| 1c | 125-135 | 20-25 | 1 | Insoluble | | |
| 2c | 125-135 | 20-25 | 1½ | Emulsifiable | | |
| 3c | 125-135 | 20-25 | 3 | Soluble | | |
| 4c | 125-135 | 20-25 | 3½ | ---do--- | | |
| 5c | 125-135 | 20-25 | 3 | ---do--- | | |
| 6c | 125-135 | 20-25 | 3 | ---do--- | | |
| 7c | 125-135 | 20-25 | 4 | ---do--- | | |
| 8c | 125-135 | 20-25 | 4 | ---do--- | | |
| 9c | 125-135 | 15-20 | 2 | Insoluble | | |
| 10c | 125-135 | 15-20 | 2¼ | Emusifiable | | |
| 11c | 125-135 | 15-20 | 2½ | Soluble | | |
| 12c | 125-135 | 15-20 | 4 | ---do--- | | |
| 13c | 125-135 | 15-20 | 3½ | ---do--- | | |
| 14c | 125-135 | 15-20 | 3¾ | ---do--- | | |
| 15c | 125-135 | 15-20 | 4 | ---do--- | | |
| 16c | 125-135 | 15-20 | 5 | ---do--- | | |
| 17c | 125-135 | 10-15 | 1 | Insoluble | | |
| 18c | 125-135 | 10-15 | 1½ | Emusifiable | | |
| 19c | 125-135 | 10-15 | 2¼ | Soluble | | |
| 20c | 125-135 | 10-15 | 3 | ---do--- | | |
| 21c | 125-135 | 10-15 | 3 | ---do--- | | |
| 22c | 125-135 | 10-15 | 3½ | ---do--- | | |
| 23c | 125-135 | 10-15 | 4 | ---do--- | | |
| 24d | 125-135 | 10-15 | 4½ | ---do--- | | |
| 25c | 130-135 | 30-35 | 1½ | Insoluble | | |
| 26c | 130-135 | 30-35 | 2 | Emulsifiable | | |
| 27c | 130-135 | 30-35 | 3 | ---do--- | | |
| 28c | 130-135 | 30-35 | 4 | Soluble | | |
| 29c | 130-135 | 30-35 | 4 | ---do--- | | |
| 30c | 130-135 | 30-35 | 5 | ---do--- | | |
| 31c | 130-135 | 30-35 | 7 | ---do--- | | |
| 32c | 130-135 | 30-35 | 8 | ---do--- | | |
| 33c | 130-135 | 30-35 | 2 | Insoluble | | |
| 34c | 130-135 | 30-35 | 2½ | ---do--- | | |
| 35c | 130-135 | 30-35 | 3 | Emulsifiable | | |
| 36c | 130-135 | 30-35 | 4 | Soluble | | |
| 37c | 130-135 | 30-35 | 4 | ---do--- | | |
| 38c | 130-135 | 30-35 | 5 | ---do--- | | |
| 39c | 130-135 | 30-35 | 7 | ---do--- | | |
| 40c | 130-135 | 30-35 | 8 | ---do--- | | |
| 41c | 125-130 | 25-35 | 2 | Insoluble | Soluble | Insoluble. |
| 42c | 125-130 | 25-35 | 2½ | ---do--- | ---do--- | Do. |
| 43c | 125-130 | 25-35 | 3½ | ---do--- | ---do--- | Dispersible. |
| 44c | 125-130 | 25-35 | 4 | ---do--- | ---do--- | Soluble. |
| 45c | 125-130 | 25-35 | 5 | ---do--- | ---do--- | Do. |
| 46c | 125-130 | 25-35 | 4¾ | ---do--- | ---do--- | Do. |
| 47c | 125-130 | 25-35 | 5½ | ---do--- | ---do--- | Do. |
| 48c | 125-130 | 25-35 | 6¾ | ---do--- | ---do--- | Do. |
| 49c | 135-140 | 30-35 | 2 | ---do--- | ---do--- | Insoluble. |
| 50c | 135-140 | 30-35 | 2¾ | ---do--- | ---do--- | Do. |

TABLE VIII—Continued

| Ex. No. | Max. temp., °C. | Max. pres., p. s. i. | Time, hrs. | Solubility | | |
|---|---|---|---|---|---|---|
| | | | | Water | Xylene | Kerosene |
| 51c | 135–140 | 30–35 | 3 | Insoluble | Soluble | Dispersible. |
| 52c | 135–140 | 30–35 | 4¼ | ----do---- | ----do---- | Soluble. |
| 54c | 135–140 | 30–35 | 5 | ----do---- | ----do---- | Do. |
| 55c | 135–140 | 30–35 | 6¼ | ----do---- | ----do---- | Insoluble. |
| 56c | 135–140 | 30–35 | 6½ | ----do---- | ----do---- | Do. |
| 57c | 125–135 | 30–35 | 2 | ----do---- | ----do---- | Do. |
| 58c | 125–135 | 30–35 | 2½ | ----do---- | ----do---- | Soluble. |
| 59c | 125–135 | 30–35 | 3 | ----do---- | ----do---- | Do. |
| 60c | 125–135 | 30–35 | 3¾ | ----do---- | ----do---- | Do. |
| 61c | 125–135 | 30–35 | 4 | ----do---- | ----do---- | Do. |
| 62c | 125–135 | 30–35 | 4 | ----do---- | ----do---- | Do. |
| 63c | 125–135 | 30–35 | 5 | ----do---- | ----do---- | Do. |
| 64c | 125–135 | 30–35 | 5½ | ----do---- | ----do---- | Do. |
| 65c | 130–135 | 30–40 | 1½ | ----do---- | ----do---- | Insoluble. |
| 66c | 130–135 | 30–40 | 2 | ----do---- | ----do---- | Do. |
| 67c | 130–135 | 30–40 | 3 | ----do---- | ----do---- | Dispersible. |
| 68c | 130–135 | 30–40 | 3½ | ----do---- | ----do---- | Soluble. |
| 69c | 130–135 | 30–40 | 5 | ----do---- | ----do---- | Do. |
| 70c | 130–135 | 30–40 | 4 | ----do---- | ----do---- | Do. |
| 71c | 130–135 | 30–40 | 4½ | ----do---- | ----do---- | Do. |
| 72c | 130–135 | 30–40 | 6 | ----do---- | ----do---- | Do. |
| 73c | 130–135 | 15–20 | 2 | ----do---- | ----do---- | Insoluble. |
| 74c | 130–135 | 15–20 | 2 | ----do---- | ----do---- | Do. |
| 75c | 130–135 | 15–20 | 3 | ----do---- | ----do---- | Do. |
| 76c | 130–135 | 15–20 | 4½ | ----do---- | ----do---- | Do. |
| 77c | 130–135 | 15–20 | 6 | ----do---- | ----do---- | Dispersible. |
| 78c | 130–135 | 15–20 | 5½ | ----do---- | ----do---- | Soluble. |
| 79c | 130–135 | 15–20 | 6½ | ----do---- | ----do---- | Do. |
| 80c | 130–135 | 15–20 | 7 | ----do---- | ----do---- | Do. |
| 1d | 130–135 | 30–35 | ½ | Emulsifiable | ----do---- | Insoluble. |
| 2d | 130–135 | 30–35 | 1 | ----do---- | ----do---- | Do. |
| 3d | 130–135 | 30–35 | 1¼ | ----do---- | ----do---- | Do. |
| 4d | 130–135 | 30–35 | 2 | ----do---- | ----do---- | Do. |
| 5d | 130–135 | 30–35 | 3 | Insoluble | ----do---- | Dispersible. |
| 6d | 130–135 | 30–35 | 1 | ----do---- | ----do---- | Soluble. |
| 7d | 130–135 | 30–35 | 1½ | ----do---- | ----do---- | Do. |
| 8d | 130–135 | 30–35 | 2½ | ----do---- | ----do---- | Do. |
| 9d | 130–135 | 30–35 | ½ | Soluble | Insoluble | Insoluble. |
| 10d | 130–135 | 30–35 | 1¼ | ----do---- | Dispersible | Do. |
| 11d | 130–135 | 30–35 | 2 | ----do---- | Soluble | Do. |
| 12d | 130–135 | 30–35 | 2¾ | ----do---- | ----do---- | Do. |
| 13d | 130–135 | 30–35 | 1 | Emulsifiable | ----do---- | Do. |
| 14d | 130–135 | 30–35 | 1½ | ----do---- | ----do---- | Do. |
| 15d | 130–135 | 30–35 | 1½ | ----do---- | ----do---- | Dispersible. |
| 16d | 130–135 | 30–35 | 2 | ----do---- | ----do---- | Soluble. |
| 17d | 135–140 | 30–35 | ½ | Insoluble | ----do---- | Do. |
| 18d | 135–140 | 30–35 | ¾ | ----do---- | ----do---- | Do. |
| 19d | 135–140 | 30–35 | ¾ | Emulsifiable | ----do---- | Do. |
| 20d | 135–140 | 30–35 | 1 | ----do---- | ----do---- | Do. |
| 21d | 135–140 | 30–35 | 1¾ | ----do---- | ----do---- | Do. |
| 22d | 135–140 | 30–35 | 2½ | Soluble | ----do---- | Do. |
| 23d | 135–140 | 30–35 | 3 | ----do---- | ----do---- | Insoluble. |
| 24d | 135–140 | 30–35 | 3½ | ----do---- | ----do---- | Do. |
| 25d | 130–135 | 15–20 | ¾ | Insoluble | ----do---- | Do. |
| 26d | 130–135 | 15–20 | 1 | Emulsifiable | ----do---- | Do. |
| 27d | 130–135 | 15–20 | 2 | ----do---- | ----do---- | Do. |
| 28d | 130–135 | 15–20 | 3 | ----do---- | ----do---- | Do. |
| 29d | 130–135 | 15–20 | 1¼ | Soluble | ----do---- | Do. |
| 30d | 130–135 | 15–20 | 1¼ | ----do---- | Insoluble | Do. |
| 31d | 130–135 | 15–20 | 1¾ | ----do---- | ----do---- | Do. |
| 32d | 130–135 | 15–20 | 2½ | ----do---- | ----do---- | Do. |

PART 8

The resin condensates which are employed as intermediate reactants are strongly basic. Initial oxyalkylation of these products with a monoepoxide or diepoxide can be accomplished generally, at least in the initial stage, without the addition of the usual alkaline catalyst such as those described in connection with oxyalkylation employing monoepoxides in Part 7 immediately preceding. As a matter of fact, the procedure is substantially the same as using a non-volatile monoepoxide such as glycide or methylglycide. However, during progressive oxyalkylation with a monoepoxide it is usually necessary to use a catalyst as previously described and, thus, there may or may not be sufficient catalyst present for the reaction with the diepoxide. Reference to the catalyst present includes the residual catalyst remaining from the oxyalkylation step in which the monoepoxide was used.

Briefly stated then, employing polyepoxides in combination with a nonbasic reactant the usual catalysts include alkaline materials, such as caustic soda, caustic potash, sodium methylate, etc. Other catalysts may be acidic in nature and are of the kind illustrated by iron and tin chloride. Furthermore, insoluble catalyst such as clay or specially prepared mineral catalysts have been used. If for any reason the reaction does not proceed rapidly enough with the diglycidyl ether or other analogous reactant then a small amount of finely divided caustic soda or sodium methylate can be employed as a catalyst. The amount generally employed would be 1% or 2%.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethyleneglycol, or the diethylether of propyleneglycol, or similar ethers, either alone or in combination with a hydrocarbon solvent. The selection of the solvent depends in part on the subsequent use of the derivatives or reaction products. If the reaction products are to be rendered solvent-free and it is necessary that the solvent be readily removed as, for example, by the use of vacuum distillation, then xylene or an aromatic petroleum solvent will serve. If the product is going to be subjected to oxyalkylation subsequently, then the solvent should be one which is not oxyalkylation-susceptible. It is easy enough to select a suitable solvent if required in any instance but, everything else being equal, the solvent chosen should be the most economical one.

Example 1e

The product was obtained by reaction between the diepoxide previously described as diepoxide 3A and oxyalkylated resin condensate 2c. Oxyalkylated condensate 2c has been described in previous Part 7 and was obtained by the oxyethylation of condensate 1b. The preparation of condensate 1b was described in Part 6 preceding. Details have been included in regard to both steps. Condensate 1b, in turn, was derived from amine 3 and resin 2a. Amine 3 has been identified previously as 2-oleyl imidazoline, and resin 2a, in turn, was obtained from para-tertiarybutylphenol and formaldehyde.

In any event, 455 grams of the oxyalkylated resin condensate previously identified as 2c were dissolved in approximately an equal weight of xylene. About 4.5 grams of sodium methylate were added as a catalyst so the total amount of catalyst present, including residual catalyst from the prior oxyalkylation, was about 4.7 grams. 17 grams of diepoxide 3A were mixed with an equal weight of xylene. The initial addition of the diepoxide solution was made after raising the temperature of the reaction mass to about 105° C. The diepoxide was added slowly over a period of about one hour. During this time the temperature was allowed to rise to about 128° C. The mixture was allowed to reflux at about 134° C. using a phase-separating trap. A small amount of xylene was removed by means of a phase-separating trap so the refluxing temperature rose gradually to about 145° C. The mixture was refluxed at this temperature for about 5 hours. At the end of this period the xylene which had been removed by means of the phase-separating trap was returned to the mixture. A small amount of material was withdrawn and the xylene evaporated on a hot plate in order to examine the physical properties. The material was an amber, or light reddish amber, viscous liquid. It was insoluble in water; it was insoluble in gluconic acid, but it was soluble in xylene and particularly in a mixture of 80% xylene and 20% methanol. However, if the material was dissolved in an oxygenated solvent and then shaken with 5% gluconic acid it showed a definite tendency to disperse, suspend, or form a sol, and particularly in a xylene-methanol mixed solvent as previously described, with or without the further addition of a little acetone.

Generally speaking, the solubility of these derivatives is in line with expectations by merely examining the solubility of the preceding intermediates, to wit, the oxyalkylated resin condensates prior to treatment with the diepoxide. These materials, of course, vary from extremely water-soluble products due to substantial oxyethylation to those which conversely are water-insoluble but xylene-soluble or oven kerosene-soluble due to high stage oxypropylation. Reactions with diepoxides or polyepoxides of the kind herein described reduce the hydrophile properties and increase the hydrophobe properties, i. e., generally make the products more soluble in kerosene or a mixture of kerosene and xylene, or in xylene, but less soluble in water. Since this is a general rule which applies throughout, for sake of brevity future reference to solubility will be omitted.

The procedure employed, of course, is simple in light of what has been said previously and in effect is a procedure similar to that employed in the use of glycide or methylglycide as oxyalkylating agents. See, for example, Part 1 of U. S. Patent No. 2,602,062 dated July 1, 1952, to De Groote.

Various examples obtained in substantially the same manner are enumerated in the following tables:

TABLE IX

| Ex. No. | Oxy-resin condensate | Amt., grs. | Diepoxide used | Amt., grs. | Catalyst (NaOCH₃), grs. | Xylene, grs. | Molar ratio | Time of reaction, hrs. | Max. temp., °C. | Color and physical state |
|---|---|---|---|---|---|---|---|---|---|---|
| 1e | 2c | 455 | 3A | 17 | 4.7 | 472 | 2:1 | 5 | 145 | Reddish-amber resinous mass. |
| 2e | 3c | 304 | 3A | 8.5 | 3.1 | 313 | 2:1 | 4.5 | 145 | Do. |
| 3e | 12c | 387 | 3A | 8.5 | 4.0 | 396 | 2:1 | 5 | 145 | Do. |
| 4e | 17c | 355 | 3A | 17 | 3.7 | 372 | 2:1 | 5 | 140 | Do. |
| 5e | 25c | 232 | 3A | 17 | 2.5 | 249 | 2:1 | 4 | 150 | Do. |
| 6e | 41c | 304 | 3A | 17 | 3.2 | 321 | 2:1 | 5 | 148 | Do. |
| 7e | 50c | 464 | 3A | 17 | 4.8 | 481 | 2:1 | 5 | 146 | Do. |
| 8e | 57c | 355 | 3A | 17 | 3.7 | 372 | 2:1 | 4 | 142 | Do. |
| 9e | 65c | 232 | 3A | 17 | 2.5 | 249 | 2:1 | 4 | 150 | Do. |
| 10e | 67c | 463 | 3A | 17 | 4.8 | 480 | 2:1 | 4.5 | 146 | Do. |
| 11e | 1d | 266 | 3A | 8.5 | 2.8 | 275 | 2:1 | 4 | 150 | Do. |
| 12e | 3d | 342 | 3A | 8.5 | 3.5 | 351 | 2:1 | 4 | 150 | Do. |
| 13e | 9d | 418 | 3A | 8.5 | 4.3 | 427 | 2:1 | 5 | 145 | Do. |
| 14e | 25d | 266 | 3A | 8.5 | 2.8 | 275 | 2:1 | 4 | 150 | Do. |
| 15e | 31d | 121 | 3A | 1.7 | 1.2 | 123 | 2:1 | 4 | 150 | Do. |

TABLE X

| Ex. No. | Oxy. resin condensate | Amt., grs. | Diepoxide used | Amt., grs. | Catalyst (NaOCH₃), grs. | Xylene, grs. | Molar ratio | Time of reaction, hrs. | Max. temp., °C. | Color and physical state |
|---|---|---|---|---|---|---|---|---|---|---|
| 1f | 2c | 455 | B1 | 27.5 | 4.8 | 483 | 2:1 | 4.5 | 155 | Reddish-amber resinous mass. |
| 2f | 3c | 304 | B1 | 13.8 | 3.2 | 318 | 2:1 | 4 | 154 | Do. |
| 3f | 12c | 387 | B1 | 13.8 | 4.0 | 401 | 2:1 | 4.5 | 154 | Do. |
| 4f | 17c | 355 | B1 | 27.5 | 3.8 | 383 | 2:1 | 4 | 158 | Do. |
| 5f | 25c | 232 | B1 | 27.5 | 2.6 | 260 | 2:1 | 4 | 156 | Do. |
| 6f | 41c | 304 | B1 | 27.5 | 3.3 | 332 | 2:1 | 4 | 160 | Do. |
| 7f | 50c | 464 | B1 | 27.5 | 4.9 | 492 | 2:1 | 5 | 145 | Do. |
| 8f | 57c | 355 | B1 | 27.5 | 3.8 | 383 | 2:1 | 5 | 150 | Do. |
| 9f | 65c | 232 | B1 | 27.5 | 2.6 | 260 | 2:1 | 4 | 150 | Do. |
| 10f | 67c | 463 | B1 | 27.5 | 4.9 | 491 | 2:1 | 5 | 152 | Do. |
| 11f | 1d | 266 | B1 | 13.8 | 2.8 | 280 | 2:1 | 4 | 155 | Do. |
| 12f | 3d | 342 | B1 | 13.8 | 3.6 | 356 | 2:1 | 5 | 150 | Do. |
| 13f | 9d | 418 | B1 | 13.8 | 4.2 | 422 | 2:1 | 5 | 150 | Do. |
| 14f | 25d | 266 | B1 | 13.8 | 2.8 | 280 | 2:1 | 4 | 160 | Do. |
| 15f | 31d | 121 | B1 | 2.8 | 1.2 | 124 | 2:1 | 4 | 160 | Do. |

TABLE XI

| Ex. No. | Oxyalkyl. resin condensate | Prob. mol. weight of reaction product | Amount of product, grs. | Amount of solvent |
|---|---|---|---|---|
| 1e | 2c | 9,450 | 4,725 | 2,363 |
| 2e | 3c | 12,480 | 2,496 | 1,248 |
| 3e | 12c | 15,800 | 3,160 | 1,580 |
| 4e | 17c | 7,440 | 3,720 | 1,860 |
| 5e | 25c | 4,970 | 4,970 | 2,485 |
| 6e | 41c | 6,410 | 3,205 | 1,603 |
| 7e | 50c | 9,620 | 4,810 | 2,405 |
| 8e | 57c | 7,440 | 3,720 | 1,860 |
| 9e | 65c | 4,970 | 4,970 | 2,485 |
| 10e | 67c | 9,600 | 4,800 | 2,400 |
| 11e | 1d | 10,970 | 2,194 | 1,097 |
| 12e | 3d | 14,000 | 2,800 | 1,400 |
| 13e | 9d | 17,040 | 3,408 | 1,704 |
| 14e | 25d | 10,970 | 2,194 | 1,097 |
| 15e | 31d | 24,630 | 2,463 | 1,232 |

TABLE XII

| Ex. No. | Oxyalkyl. resin condensate | Prob. mol. weight of reaction product | Amount of product, grs. | Amount of solvent |
|---|---|---|---|---|
| 1f | 2c | 9,660 | 4,830 | 2,415 |
| 2f | 3c | 12,690 | 2,538 | 1,269 |
| 3f | 12c | 16,010 | 3,202 | 1,601 |
| 4f | 17c | 7,650 | 3,825 | 1,913 |
| 5f | 25c | 5,180 | 5,180 | 2,590 |
| 6f | 41c | 6,620 | 3,310 | 1,655 |
| 7f | 50c | 9,830 | 4,915 | 2,458 |
| 8f | 57c | 7,650 | 3,825 | 1,913 |
| 9f | 65c | 5,180 | 5,180 | 2,590 |
| 10f | 67c | 9,810 | 4,905 | 2,453 |
| 11f | 1d | 11,180 | 2,230 | 1,118 |
| 12f | 3d | 14,210 | 2,842 | 1,421 |
| 13f | 9d | 17,250 | 3,450 | 1,725 |
| 14f | 25d | 11,180 | 2,236 | 1,118 |
| 15f | 31d | 24,840 | 2,484 | 1,242 |

At times we have found a tendency for an insoluble mass to form or at least to obtain incipient cross-linking or gelling even when the molal ratio is in the order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent, such as the diethylether of ethyleneglycol may be employed. Another procedure which is helpful is to reduce the amount of catalyst used, or reduce the temperature of reaction by adding a small amount of initially lower boiling solvent, such as benzene, or use benzene entirely. Also, we have found it desirable at times to use slightly less than apparently the theoretical amount of diepoxide, for instance, 90% to 95% instead of 100%. The reason for this fact may reside in the possibility that the molecular weight dimensions on either the resin molecule or the diepoxide molecule actually may vary from the true molecular weight by several percent.

The condensate can be depicted in a simplified form which, for convenience, may be shown thus:

(Amine)CH$_2$(Resin)CH$_2$(Amine)

If such product is subjected to oxyalkylation reaction involves the phenolic hydroxyls of the resin structure and, thus, can be depicted in the following manner:

(Amine)CH$_2$(Oxyalkylated Resin)CH$_2$(Amine)

Following such simplification the reaction with a polyepoxide, and particularly a diepoxide, would be depicted thus:

(Amine)CH$_2$(Oxyalkylated Resin)CH$_2$(Amine)

(Amine)CH$_2$(Oxyalkylated Resin)CH$_2$(Amine)

in which D. G. E. represents a diglycidyl ether as specified.

As has been pointed out previously, the condensation reaction may produce other products, including, for example, a product which may be indicated thus in light of what has been said previously:

[(Amine)CH$_2$(Resin)]

This product, since it is susceptible to oxyalkylation by means of the oxyalkylated phenolic hydroxyl groups and depending on the selection of the amine, may be susceptible to oxyalkylation in event a hydroxylated amine or polyamine had been used, and may be indicated in the following manner:

[Oxyalkylated(Amine)CH$_2$(Resin)]

When a diglycidyl ether is employed one would obviously obtain compounds in which two molecules of the kind described immediately preceding are united in a manner comparable to that previously described, which may be indicated thus:

Oxyalkylated(Amine)CH$_2$(Resin)

Oxyalkylated(Amine)CH$_2$(Resin)

Likewise, it is obvious that the two different types of oxyalkylation-susceptible compounds may combine so as to give molecules which may be indicated thus:

(Amine)CH$_2$(Oxyalkylated Resin)CH$_2$(Amine)

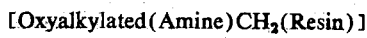

Oxyalkylated(Amine)CH$_2$(Resin)
Oxyalkylated(Amine)CH$_2$(Amine)

(Amine)CH$_2$(Oxyalkylated Resin)CH$_2$(Amine)
Oxyalkylated(Amine)CH$_2$(Amine)

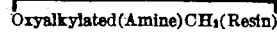

Oxyalkylated(Amine)CH$_2$(Resin)
Oxyalkylated(Amine)CH$_2$(Amine)

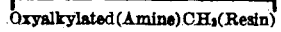

Oxyalkylated(Amine)CH$_2$(Amine)

Actually, the product obtained by reaction with a diglycidyl ether could show considerably greater complexity due to the fact that, as previously pointed out, the condensate reaction probably does not yield a hundred percent condensate in absence of other byproducts. All this simply emphasizes one fact, to wit, that there is no suitable method of characterizing the final reaction product except in terms of method of manufacture.

PART 9

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials of our invention when employed as demulsifying agents.

The materials of our invention, when employed as treating or demulsifying agents, are used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

In many instances the oxyalkylated products herein specified as demulsifiers can be conveniently used without dilution. However, as previously noted, they may be diluted as desired with any suitable solvent. For instance, by mixing 75 parts by weight of an oxyalkylated derivative, for example, the product of Example 3e, with 15 parts by weight of xylene and 10 parts by weight of isopropyl alcohol, an excellent demulsifier is obtained. Selection of the solvent will vary, depending upon the solubility characteristics of the oxyalkylated product, and of course will be dictated in part by economic considerations, i. e., cost.

As noted above, the products herein described may be used not only in diluted form, but also may be used admixed with some other chemical demulsifier. A mixture which illustrates such combination is the following:

Oxyalkylated derivative, for example, the product of Example 3e, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.

The above proportions are all weight percents.

PART 10

The products, compounds, or the like, herein described can be employed for various purposes and particularly for the resolution of petroleum emulsions of the water-in-oil type as described in detail in Part 9, preceding.

Such products can be reacted with alkylene imines, such as ethylene imine or propylene imine, to produce cation-active materials. Instead of an imine one may employ what is a somewhat equivalent material, to wit, a dialkylaminoepoxypropane of the structure

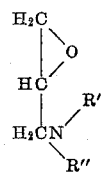

wherein R' and R'' are alkyl groups.

It is not necessary to point out that, after reaction with a reactant of the kind described which introduces a basic nitrogen atom, the resultant product can be employed for the resolution of emulsions of the water-in-oil type as described in Part 5, preceding, and also for other purposes described hereinafter.

Referring now to the use of the products obtained by reaction with a polyepoxide and certain specified oxyalkylated products obtained in the manner described in Part 7, preceding, it is to be noted that in addition to their use in the resolution of petroleum emulsions they may be used as emulsifying agents for oils, fats, and waxes, as ingredients in insecticide compositions, or as detergents and wetting agents in the laundering, scouring, drying, tanning and mordanting industries. They may also be used for preparing boring or metal-cutting oils and cattle dips, as metal pickling inhibitors, and for pharmaceutical purposes.

Not only do these oxyalkylated derivatives have utility as such but they can serve as initial materials for more complicated reactions of the kind ordinarily requiring a hydroxyl radical. This includes esterification, etherization, etc.

The oxyalkylated derivatives may be used as valuable additives to lubricating oils, both those derived from petroleum and synthetic lubricating oils. Also, they can be used as additives to hydraulic brake fluids of the aqueous and non-aqueous types. They may be used in connection with other processes where they are injected into an oil or gas well for purpose of removing a mud sheath, increasing the ultimate flow of fluid from the surrounding strata, and particularly in secondary recovery operations using aqueous flood waters. These derivatives also are suitable for use in dry cleaners' soaps.

More specifically, such products, depending on the nature of the initial resin, the particular monoepoxide selected and the ratio of monoepoxide to resin, together with the particular polyepoxide employed, result in a variety of materials which are useful as wetting agents or surface tension reducing agents; as detergents, emulsifiers or dispersing agents; as additives for lubricants, both of the natural petroleum type and the synthetic type, as additives in the flotation of ores, and at times as aids in chemical reactions insofar that demulsification is produced between the insoluble reactants. Furthermore, such products can be used for a variety of other purposes, including use as corrosion inhibitors, defoamers, asphalt additives, and at times even in the resolution of oil-in-water emulsions. They serve at times as mutual solvents promoting a homogeneous system from two otherwise insoluble phases.

The products herein described can be reacted with polycarboxy acids, such as phthalic acid or anhydride, maleic acid or anhydride, diglycolic acid, and various tricarboxy and tetracarboxy acids so as to yield acylated derivatives, particularly if one employs one mole of the polycarboxy acid for each reactive hydroxyl radical present in the final polyepoxide-treated product. Thus, one obtains a comparatively large molecule in which there is a plurality of carboxyl radicals. Such acidic fractional esters are suitable for the resolution of petroleum emulsions of the water-in-oil type as herein described.

Having thus described our invention what we claim as new and desire to secure by Letters Patent is:

1. A three-step manufacturing process involving (1) condensation; (2) oxyalkylation with a monoepoxide; and (3) oxyalkylation with a polyepoxide containing at least two 1,2-epoxy rings; said first manufacturing step being a method of (A) condensing (a) a fusible, non-oxygenated organic solvent-soluble, water-insoluble, phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

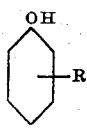

in which R is a saturated aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines wherein the substituent is an organic radical composed of elements selected from the group consisting of carbon, hydrogen, oxygen and nitrogen and in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable followed as a second step by (B) oxyalkylation by means of an alpha-beta alkylene oxide having not more than 4 carbon atoms and selected from the class consisting of ethylene oxide, propylene oxide, butylene oxide, glycide and methylglycide; and then completing the reaction by a third step of (C) reacting said oxyalkylated resin condensate with a phenolic polyepoxide free from reactive functional groups other than 1,2-epoxy and hydroxyl groups and cogenerically associated compounds formed in the preparation of said polyepoxides; said epoxides being monomers and low molal polymers not exceeding the tetramers; said polyepoxides being selected from the class consisting of (aa) compounds where the phenolic nuclei are directly joined without an intervening bridge radical, and (bb) compounds containing a radical in which 2 phenolic nuclei are joined by a divalent radical selected from the class consisting of ketone residues formed by the elimination of the ketonic oxygen atom, and aldehyde residues obtained by the elimination of the aldehyde oxygen atom, the divalent radical

the divalent

radical, the divalent sulfone radical, and divalent monosulfide radical —S—, the divalent radical —CH$_2$SCH$_2$— and the divalent disulfide radical —S—S—; said phenolic portion of the polyepoxide being obtained from a phenol of the structure

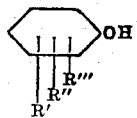

in which R', R", and R''' represent a member of the class consisting of hydrogen and saturated hydrocarbon substituents of the aromatic nucleus, said substituent member having not over 18 carbon atoms; with the further proviso that said reactive monoepoxide-oxyalkylated resin condensates and aryl polyepoxides be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between the monoepoxide-oxyalkylated resin condensate and aryl polyepoxide be conducted below the pyrolytic point of the reactants and the resultants of reaction; and with the final proviso that the ratio of reactants be 2 moles of the oxyalkylated resin condensate to 1 mole of the phenolic polyepoxide.

2. The method of claim 1 wherein the precursory phenol contains at least 4 and not over 14 carbon atoms in the substituent radical and the precursory aldehyde is formaldehyde.

3. The product obtained by the method described in claim 1.

4. A three-step manufacturing process involving (1) condensation; (2) oxyalkylation with a monoepoxide; and (3) oxyalkylation with a diepoxide; said first manufacturing step being a method of (A) condensing (a) an oxyalkylation-susceptible, fusible, non-oxygenated organic solvent-soluble, water-insoluble, low-stage phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

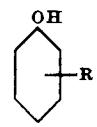

in which R is a saturated aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction; and with the proviso that the resinous condensation product resulting from the process be heat-stable and oxyalkylation-susceptible; followed as a second step by (B) oxyalkylation by means of an alpha-beta alkylene oxide having not more than 4 carbon atoms and selected from the class consisting of ethylene oxide, propylene oxide, butylene oxide, glycide and methylglycide; and then completing the reaction by a third step of (C) reacting said oxyalkylated resin condensate with a compound consisting essentially of the following formula

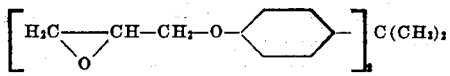

with the further proviso that said reactive monoepoxide-oxyalkylated resin condensates and aryl diepoxides be members of the class consisting of non-thermosetting organic solvent-soluble liquids and solids melting below the point of pyrolysis; with the added proviso that the reaction product be a member of the class of solvent-soluble liquids and solids melting below the point of pyrolysis; said reaction between the monoepoxide oxyalkylated resin condensate and aryl diepoxide be conducted below the pyrolytic point of the reactants and the resultants of reaction; and with the final proviso that the ratio of reactants be 2 moles of the oxyalkylated resin condensate to 1 mole of the phenolic diepoxide.

References Cited in the file of this patent

UNITED STATES PATENTS 2,521,911    Greenlee    Sept. 12, 1950
2,695,891    De Groote    Nov. 30, 1954